(12) United States Patent
Renk et al.

(10) Patent No.: US 6,606,171 B1
(45) Date of Patent: Aug. 12, 2003

(54) DIGITIZING SCANNER

(75) Inventors: Jeffrey D. Renk, Derry, NH (US);
Richard F. Lehman, Nashua, NH (US);
Mark R. Fernald, Amherst, NH (US);
Calvin M. Winey, Carlisle, MA (US)

(73) Assignee: Howtek, Inc., Hudson, NH (US)

( * ) Notice: Subject to any disclaimer, the term of this patent is extended or adjusted under 35 U.S.C. 154(b) by 0 days.

(21) Appl. No.: 08/948,108

(22) Filed: Oct. 9, 1997

(51) Int. Cl.[7] ................................................. H04N 1/04
(52) U.S. Cl. ........................................ 358/475; 358/487
(58) Field of Search ................................. 358/475, 509, 358/496, 483, 474, 487, 506; 250/205, 208.1, 234, 578.1, 239; 362/800

(56) References Cited

U.S. PATENT DOCUMENTS 5,902,993 A  * 5/1999 Okushiba et al. ......... 250/208.1

* cited by examiner

*Primary Examiner*—Cheukfan Lee
(74) *Attorney, Agent, or Firm*—Cesari and McKenna, LLP

(57) ABSTRACT

A digitizing scanner particularly for scanning transparent films such as X-rays provides an improved illuminator for transmitting light through the film. The illuminator defines a line array of a plurality of individually calibrated and controlled LEDs. The LEDs are calibrated by determining their relative points of projection on a CCD camera array. The camera array scans the LEDs and adjusts them individually to produce a predetermined illumination pattern from the group. The adjustment occurs over a plurality of cycles that address cross-talk between LEDs in the array. The camera includes anti-reflection elements to minimize bounce-back of image light and noise suppression circuitry to reduce low-level signal noise. A central processing unit, interconnected with the camera assembly includes a pixel averager to reduce the inherent resolution of the CCD to a desired level and to attenuate further noise. The scanner can include an illuminator for illuminating a scannable opaque bar-code strip and size-measurement circuitry for determining the relative size and location of the scanned image.

16 Claims, 24 Drawing Sheets

DIGITIZING SCANNER

FIELD OF THE INVENTION

This invention relates to an improved digitizing scanner, and more particularly to a scanner for reading and storing graphical and textual image data from transparent and translucent sheets such as developed X-ray film.

BACKGROUND OF THE INVENTION

Electro-optical digitizing scanners are commonly employed as peripheral devices linked with microcomputers and other data processing and storage devices. Scanners enable graphical and text data to be accurately converted into stored digital data for further processing and interpretation by, for example, a microcomputer. Scanners are adapted to read data from a variety of media and formats. Opaque and transparent sheets are two common forms of scanned media.

An image on a sheet is defined by light areas ("highlights") and dark areas ("shadows"). To convert the light and dark areas into corresponding image data, the scanner typically illuminates the sheet with a light source. In one form of scanner, a camera assembly moves along the length of the sheet. In another, the sheet moves relative to a stationary camera. As the sheet moves relative to the camera, the camera "scans" the width of the illuminated image, converting the scanned portion of the image into a data signal. This scanned image is said to be "digitized" in that the image is converted into a data file stored in a digital format with information representative of discrete segments or "pixels." The data in the file includes instructions on how to assemble the individual pixels into a cohesive two-dimensional image that reflects the original scanned image. The data file also includes information on the intensity value for each pixel and its color, if applicable, or grayscale shade.

A common form of camera assembly for use in a digitizing scanner is the solid-state CCD camera, which contains a linear array of photosensitive picture elements, often termed "pixels." Each pixel element receives light in its local area. The pixel generates an intensity-based signal depending upon how much light it receives. The aggregate signal of all the pixel elements is a representation of a widthwise "line" of the image.

Generally, the CCD pixel array only scans a single line that is several thousand pixels wide in the fast scan direction but that has a height of only one pixel in the slow scan direction. The array is typically wide enough to scan the entire image width at once. Because an entire line is generally viewed at once, this is known as the "fast scan" direction; since the delay is only in downloading the signal from the CCD to the data processor. Conversely, the direction of movement of the camera/image is known as the "slow-scan" direction. In summary, images are scanned in a "line-by-line" manner in which the image moves in the slow scan direction relative to the camera's fast scan field of view. As the image passes through the field of view, a succession of scanned width-lines of the image are converted into image data, and the CCD element generates a continuous signal representative of the intensity of each pixel in the line.

Scanners used for scanning opaque sheets must illuminate the image by reflecting illumination light off the surface of the sheet from the same side as the camera. Conversely, when transparent or translucent sheets are scanned, the image is illuminated from the opposite side of the sheet from the camera, allowing the light to pass through the image to the camera. In this manner, the image attenuates the light as it is transmitted through the sheet to the camera.

CCD elements are generally smaller in width than the scanner's total scan width. A focusing lens is employed to focus illumination light from the scanned image onto the narrower viewing area of the CCD. The focused image will generally exhibit a degradation in the field of view at the far edges of the width (e.g. a loss of exposure). This loss of exposure occurs because the amount of light entering a lens tends to decrease at the edges of the field of view according to the $Cos^4$ characteristic of lenses. It is often desirable to increase the light near the edges of the camera's field of view to compensate for this effect. However, most illuminators comprise only one or two discrete light sources, such as a long fluorescent bulb. The intensity of such a bulb is not generally controllable along its length. In fact the bulb may exhibit variability in light output along its length, presenting a different level of intensity to different pixels in the array. This problem becomes exacerbated as the bulb ages. In addition, the pixels of the CCD camera may exhibit different responses to the same intensity of light. The CCD pixels can be calibrated to account for most variations, but it is desirable to have the capability of changing the profile of light presented to the various pixels. In general compensation for an uneven light profile is difficult using a single illumination bulb.

Scanners derive a large quantity of information from a single sheet containing an image. When a sizable number of images are stored for long-term use, superfluous data related to edges and margins can become a concern. Substantial computing resources in both time and storage capacity can be devoted to unneeded data. In particular, images substantially narrower than the maximum field of view of the scanner are often scanned as if the full width (in fast scan direction) of the scanner is employed. It is desirable, therefore, to accurately gauge the size of the needed data range, and only scan the image within the needed range in both the fast scan and slow scan directions. In the past this has been accomplished primarily by manually inputting the size of the sheet to be scanned. Alternatively, movable edge guides can be linked to a size sensor that inputs the relative width of the input sheets. An electromechanical/optical length sensor starts and ends the scanning process as the front and rear edges of the sheet pass through the scanner. However, these techniques still require accurate registration of input sheets and do not determine the size of the margins.

The scanning of translucent sheets is desirable in the medical field, and presents particular challenges. In particular, there is a need to digitally store and reproduce diagnostic radiological films, commonly termed "X-rays." Most patient X-ray films, in fact, are produced in a "series" that can consist of six or more individual, interrelated X-rays. Hundreds, or even thousands, of X-ray films are produced daily by a large hospital. By electronically storing and indexing radiological images, they can be made available indefinitely without taking up valuable physical storage space. In addition, various specialized graphical processes and image enhancement techniques can be used in connection with stored X-ray images. Furthermore, scanned radiological data can be easily transmitted to practitioners at remote locations via electronic mail or facsimile. In all, the ability to accurately and reliably scan developed X-ray film images provides an important diagnostic tool for medical practitioners.

The scanning of developed X-ray film presents some particular challenges. X-rays tend to exhibit a large area of shadows with both abrupt transitions, and more subtle dark, clouded areas. Hence, the CCD element intermittently must operate at a low output level throughout the scanning process. Low light intensity causes the CCD element to transmit a corresponding low output signal. Electronic noise is accentuated at this low output level, causing inaccuracies in the scanned image data. Incandescent and fluorescent light sources often have short life spans that may render them unsuitable for a large volume radiological scanner. Alternatively solid-state illumination devices, such as light emitting diodes (LEDs) must be used in large arrays. While they are energy-efficient, long-lived, and consistent over their service life, they may have wide variability in output intensity—even LEDs in the same production batch. Thus the light intensity pattern presented by an unadjusted array of LEDs can exhibit substantial, undesirable variation in intensity across the scan width.

An illuminator that is larger in width that the image can cause imaging problems. Scattered, stray light from the outer edges of the illuminator, beyond the scanned width of the image, can cause distortion and refraction patterns in the optics of the camera assembly that degrade the scanned image. The width of projection of most light sources, such as elongated fluorescent bulbs, cannot be easily or reliable varied.

Medical X-ray film images are usually scanned at approximately 150 pixels per inch (PPI) resolution, since this value enables a 14-inch image to be displayed on a standard 2,000-pixel-wide monitor. This resolution is generally considered sufficient for radiological data storage and reproduction purposes. The native resolution of many currently available CCD camera elements is approximately 8,000–12,000 CCD picture elements. Divided over a 14-inch image this number of picture elements can provide native resolutions of at least four times the number of pixels called for. It is desirable to derive image data at the lowest needed resolution to reduce scanning time and storage requirements. Lower resolution is also desirable when transmitting data over low-speed transmission lines to save time. An efficient technique for changing the resolution of the system is desired.

Some circumstances may warrant the inclusion of specific image data details at a higher resolution. These details are regions of particular interest on an overall "parent" image. It is desirable to provide a technique for producing higher resolution image files of regions of interest, and electronically associating these high-resolution detail files with the overall "parent" image.

While the individual pixels of currently available CCD camera elements exhibit relatively consistent pixel-to-pixel output, there is still signal variability between individual pixels in an array. In particular, the signal for a dark image (the "dark current" signal) can vary significantly from pixel to pixel. An adjustment function is used to vary each pixel's output signal so that it attains a desired uniform value. In particular, look-up tables based upon predefined smoothing functions are often used to provide a positive or negative adjustment bias to individual CCD pixels. The gain exhibited by each individual CCD pixel is also adjusted by deriving the change in output signal for a standard dark image and a standard light image. The output signals of each of the thousands of pixels in the array must be adjusted with an individual set of bias and gain adjustment factors. This adjustment procedure consumes substantial amounts of processing time and resources as the linear output of each pixel is summed with an appropriate positive or negative bias factor to provide each pixel with an approximately equal dark current response. It is often desirable to deliver a final signal from a CCD pixel in a logarithmic, or another non-linear converted form. If the final non-linear signal is to be sampled to provide the basis for adjusting the bias at the linear input stage, then the device must have an accurate representation of the function being used to convert the linear signal into the final, non-linear signal. With foreknowledge of the type of non-linear output to be expected for a given linear input, the function can determine the mount of bias needed at the linear stage to generate a proper shift in the output at the non-linear stage. In other words, if the non-linear output is off by x, then the function knows that a deviation of Log(x) has occurred at the linear stage and this value is a correction factor to the input.

However, preprogrammed tables of bias correction factors do not always accurately predict the real response of a system. Likewise many signal processing functions cannot be easily characterized. Using a function or a preprogrammed table of expected correction factors to effect CCD pixel bias calibration can result in inaccurate data and can expend substantial time and computing resources. This inaccuracy can be encountered even in linear signal conversion circuits.

Notwithstanding the foregoing, reliability, repeatability of results and ease of use remain a significant concern in any medical device. In particular, a medical digitizing scanner must meet certain guidelines promulgated by the US Food and Drug Administration and other regulatory agencies in the United States and abroad.

In view of the foregoing disadvantages of the prior art, it is an object of this invention to provide a digitizing scanner, particularly applicable to translucent sheets such as X-ray film having an improved illumination system and camera arrangement that produces highly accurate and consistent scanned image data. The illumination system should be self-calibrating, have a long service life and should compensate for optical and light source inconsistencies. The camera arrangement should operate efficiently at a desired resolution, should minimize distortion, exhibit a high degree of optical precision and should include adequate noise suppression capabilities for enhancing the quality of scanned images. The camera element should be readily calibrated, particularly in the logarithmic output signal domain. In addition, the size of the image to be scanned should be accurately determined and located automatically. The illuminator width should be readily adjustable to fit the size of the image.

SUMMARY OF THE INVENTION

The digitizing scanner according to this invention overcomes the disadvantages of the prior art by providing a plurality of improved components and functions. In a preferred embodiment, the digitizing scanner is generally arranged so that an illuminator transmits light through a transparent or translucent sheet into a stationary camera assembly. The image on each sheet passes through the field of view of a linear CCD camera assembly as sheets are driven lengthwise in the "slow scan" direction by a feed roller assembly. The CCD captures a succession of lines of the image. Each line is oriented widthwise, in the "fast scan" direction. Images are transmitted as an image signal to the scanner's central processing unit (CPU) and to a microcomputer or other data processing/storage device as image file data. The sheets can comprise developed X-ray film having black and white radiological images thereon. The CCD can transmit information according to a corresponding black and white "grayscale."

According to one embodiment, the scanner includes an improved illuminator for illuminating an image. The illuminator consists of a linear array of individually controllable light emitting diodes (LEDs). The driving current for each LED is varied during a calibration procedure in which the output light intensity of each LED is independently measured by the scanner's camera, and the driving current is adjusted in a series of adjustment cycles, or "passes" to provide a predetermined consistent light output across the array. The light output pattern naturally adjusts for inherent optical and camera inconsistencies, since the output is varied based upon the pattern actually viewed by the camera. The LED array can include a photosensitive sensor that measures the light output of one LED to derive a reference light intensity. The other LEDs in the array are calibrated based upon this reference. A coarse intensity adjustment can also be employed before each LED is individually adjusted. Adjustment typically occurs in increments, varying the LEDs driving current as a product of the old current times the ratio of the average array illumination level versus the LED's illumination level.

In another embodiment, a housing for the LED array can include a pair of tapered walls that enclose part of each LED's bulb. The walls taper to a narrower opening adjacent a translucent diffuser window. The illumination light projected by the LEDs exits the diffuser window in a highly diffuse form.

In another embodiment, a secondary illuminator is provided adjacent the same face of the sheet as the camera assembly. The illuminator can comprise a variety of acceptable light sources arranged to project a reflected light onto a predetermined section of the sheet, typically in a margin. The predetermined section includes an opaque bar code strip or another identifier. The CPU can include instructions for reading and interpreting the strip or identifier, and can control the procedure for reading the strip at predetermined times.

In another embodiment, the camera assembly comprises an enclosure having a sealing window oriented in the widthwise direction for receiving light transmitted from the image. The window allows light to strike a series of reflectors that define an optical path. The optical path terminates at a focusing lens and the CCD camera element. A transparent covering window is positioned between the focusing lens and the CCD camera element, adjacent the CCD camera element. The sealing window is oriented at a non-perpendicular angle to a plane passing perpendicularly through the optical path to divert stray light out of the optical path. In one embodiment the angle is set preferably at 7°–15°. However, any angle that enables diversion of stray light without unduly compromising the optical performance of the camera assembly is acceptable. The camera and the covering window, as a unit are tilted in the housing at an angle preferably between 7° and 15° relative to a plane passing perpendicularly through the optical path. The reflectors can be mounted on a rigid frame member on respective adjustable mounts.

In another embodiment, the output image signal from the CCD element can be processed dynamically to reduce noise in the low-intensity (shadow) signal range. A two stage logarithmic amplifier is employed to amplify the signal by 100 dB in two 50 dB stages. A variable low-pass filter reduces the bandwidth of the signal between the two stages according to predetermined criteria. Specifically, a control amplifier controls the filter's maximum allowable signal bandwidth based upon the current value of the output image signal. For low-intensity output signal values below a predetermined lower limit, a minimum allowable bandwidth is selected. The allowable bandwidth increases to a maximum value wherein a predetermined upper limit is reached. This upper limit is at the upper end of the low-intensity output signal value range. The filtered output signal of the filter is passed through the second stage of the logarithmic amplifier and the output of the second stage amplifier is summed with the output of the first stage logarithmic amplifier to produce a 100 dB filtered logarithmic output signal. This signal is converted into useable digital and linear form by appropriate converters.

In another embodiment, resolution of the CCD camera element is reduced from a higher resolution by averaging the values of adjacent fast scan pixels in the fast scan direction and deriving a single pixel intensity for the entire grouping. Pixel intensity values are preferably combined in adjacent pixel groupings of 2, 4 or 8. The resulting summed intensity values are averaged in the binary domain by shifting the sum by 1, 2 or 3 bits, respectively. Averaging of pixel values in the slow scan direction is accomplished by varying the scan speed of the image to present a plurality of lines to the CCD camera array in a given scan cycle. In a preferred embodiment, the scan speed is varied by controlling the operating speed of the feed roller drive motor. The CCD camera element samples lines at a fixed rate. By increasing the scan speed, a larger area in the slow scan direction is presented to the camera during each sample cycle. The area scanned is read by the CCD camera element as an average intensity signal for each CCD pixel. Preferably, 2, 4 or 8 lines are averaged, resulting in an average line signal that represents a line of pixel intensity values for the entire grouping of lines. The average pixel values derived from either, or both, fast scan and slow scan pixel averaging are stored as an image data file according to the new, reduced resolution.

In another embodiment, the size of a sheet fed into the scanner is automatically determined, and the amount of data taken and stored by the scanner is adjusted using the intensity readings of the camera element. The sheet is fed by the rollers into the field of view of the camera assembly. The camera begins scanning before the sheet arrives at its field of view. The intensity transition between the free space before the edge of the sheet and the attenuated intensity as the sheet passes into the field of view is identified by the CPU as the lead edge of the sheet. The CPU maps the location of the lead edge to the feed motor's position by counting steps or reading another movement sensor signal operatively connected to the motor. The widthwise edges of the sheet are then determined by locating intensity transitions on either side of the sheet along the fast scan direction. The location of the side edges can be mapped at predetermined intervals relative to the motor's position or the location can be mapped continuously. The CPU continuously polls for a second intensity transition at the tail edge in the slow scan direction. The second transition, when identified by the CPU, is mapped relative to the motor's location by the CPU and the sheet is reversed by the rollers until the top margin is again upstream of the camera assembly's field of view. The sheet is then fed by the rollers through the scanner again. Only data falling substantially within the mapped boundaries of the sheet, based upon the current position of the motor, are acquired and stored for further processing.

In another embodiment, the illumination assembly is adjustable to deactivate selected light sources having respective centers of projection that fall outside of the widthwise edges of the sheet, or another set of widthwise limits. The programmable current sources for selected light sources are instructed by the CPU to assume a minimum current or "off" setting. The deactivated light sources can be selected based upon their known physical locations along the width of a sheet. Selection can occur based upon manually input width measurements or based upon automatic size sensing functions, such as the procedures described above.

In another embodiment, the image is annotated with stored identifiers that link the image to a higher resolution file having image data related to a specific area of interest on the main image. The linking can be made according to the ANSI-DICOM-3 standard. According to this standard the main image is stored in a predetermined format. A high-resolution subfile is created by rescanning a particular region of the sheet containing the main image. This subfile is also stored in the predetermined format, and the two files are linked for subsequent display and data transmission. The use of a smaller high-resolution linked file saves valuable storage capacity and data handling time, particularly during data transfer to remote sites. Sheets remain in the feed rollers of the scanner until all scans have been accomplished, selectively driving the sheet in reverse, and forward again until all scanning operations have been completed.

In another embodiment, a method for bias calibration of CCD pixels in the camera array that enables efficient adjustment of the bias of individual CCD pixels in the linear mode based upon a sensed output of each of the pixels in the logarithmic domain is provided. A group of pixels from the overall array is exposed to a substantial absence of light representing a maximum dark intensity image. This is accomplished by deactivating the illumination assembly. The linear output of each of the pixels is amplified using a signal converter, such as a logarithmic amplifier, and more particularly, the two-stage amplifier employed in the above-described filtering circuit. Each CCD pixel in the group is assigned a specific bias value that is summed with the respective pixel's output to the dark intensity to create an incremental ramp of bias-adjusted linear inputs to the logarithmic amplifier that are amplified into a set of logarithmic system response values at the output of the logarithmic amplifier. The ramp of individual bias values is stepped incrementally from a minimum negative bias value to a maximum positive bias value. The minimum negative value and the maximum positive bias value are of equal magnitude and opposite sign of voltage/current according to a preferred embodiment. The bias values between the minimum and maximum are equal, increasing increments of voltage/current. The logarithmic amplifier is precalibrated to generate a minimum, negative system response output in the logarithmic domain when the minimum bias value is input and a maximum, positive system response output in the logarithmic domain when the maximum bias value is input. The negative and positive system response output values are, likewise, equal in magnitude, and opposite in sign according to a preferred embodiment. Each logarithmic domain system response is mapped to the input bias that produced the response. The mapping process results in a table or "curve" of logarithmic system response versus input linear bias. The approximate middle of the curve represents a desired system response of 0 for the CCD array. A given bias value on the ramp (approximately half-way between the minimum and maximum value) produces a baseline, 0-system response. The values for data points in the curve can be represented by numerical digital integers that are translated using appropriate digital/analog and analog/digital converters. The curve of system response versus bias is manipulated through inversion and translation to derive another curve (in look-up table form) of bias adjustment factors for a respective set of deviation values from the desired base response for a pixel at a dark current output. The response of each pixel in the array is then measured in the logarithmic domain. The curve is queried to assign the appropriate linear bias adjustment factor to each pixel based upon its logarithmic output. The bias adjustment factor assigned to each pixel is mapped to that pixel and applied to the linear output of that pixel each time it transmits an intensity signal. According to a preferred embodiment, eight bias and associated system response data points can be summed to generate a single look-up table point. Deviations from the base value that fall between the averaged points can be derived through linear interpolation. By assigning a ramped bias to each pixel in a group that spans approximately one decade of logarithmic output, a bias correction factor table can be developed in a single 8-millisecond scan cycle. Curve-smoothing and point-averaging functions are employed to ensure that variations in the output signals of individual pixels do not unacceptably disrupt the continuity of the response curve.

It is expressly contemplated that any of the above-described embodiments can be employed in conjunction with one or more of the other above-described embodiments in the digitizing scanner according to this invention.

BRIEF DESCRIPTION OF THE DRAWINGS

The foregoing and other objects and advantages of the invention will become more clear with reference to the following detailed description as illustrated by the drawings in which.

DETAILED DESCRIPTION

1. System Overview

Figure 1:
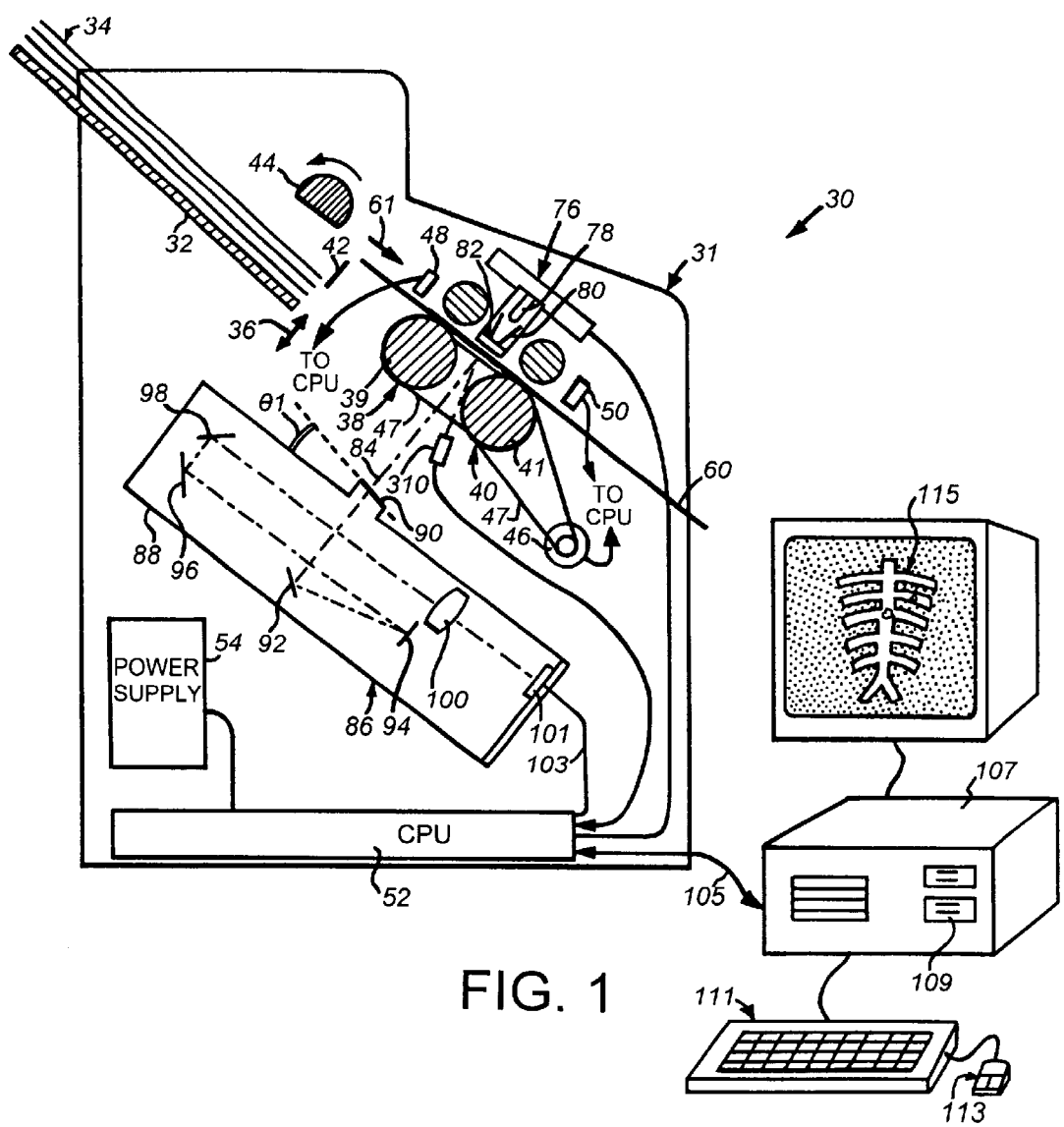
FIG. 1 is a schematic cross-section and perspective view of a digitizing scanner for scanning and storing image data from transparent and translucent sheets according to this invention.

The scanner of this invention is shown in overall detail in FIG. 1. The scanner system 30 comprises an outer housing 31 constructed from metal, plastic or another acceptable, housing material that covers. An internal framework (not shown) is employed to support the housing and the components in a predetermined alignment. Within the housing is mounted a feed tray 32 holding a plurality of sheets in a stack 34. The tray 32 moves upwardly and downwardly (double arrow 36) to feed sheets intermittently to two pairs of feed rollers 38 and 40. The feed roller pairs each comprise a respective drive roller 39 and 41 and a pressure roll 49 and 51. A stripper 42 and a pick roll assembly 44, in combination, singulate each uppermost sheet in the stack 34, and direct each sheet into the feed roller pairs 38 and 40. The operation of the feed mechanism can be conventional or, alternatively, single sheets can be fed directly from a feed slot to the feed roller pairs 38 and 40. The lower drive rollers 39 and 41, respectively of each feed roller pair 38 and 40 are driven by a central drive motor 46 and each individual drive roller is interconnected with, and driven by, the drive motor 46 by a series of belts 47 that can be conventional. The motor 46 can comprise a stepper motor that drives the rollers 39 and 41 in either a forward or reverse direction based upon a predetermined number of "steps" or rotational increments.

An upstream sensor 48 resides at the inlet of the upstream feed roller pair 38 and another, downstream sensor 50 resides at the outlet of the downstream feed roller pair 40. The upstream sensor 48 is also termed the "trail edge" sensor since it is used herein to sense passage of the trailing edge of a sheet therethrough. Likewise, the downstream sensor 50 is termed the "lead edge" sensor since it is used herein to sense the arrival of the lead edge to the sensor's position in the feed path. Each edge sensor 48 and 50 can comprise a conventional microswitch or electro-optical transmitter having an output connected to the scanner's Central Processing Unit (CPU) 52.

The CPU 52 can comprise a variety of data processing and control including one or more microprocessors. The function of the CPU is described further below with reference to each individual component and its functions. Each operating component is, likewise, interconnected with the CPU by an appropriate analog, digital-serial or digital-parallel link. Power to the CPU and other components is provided by a power supply 54 that receives power from batteries, an alternating current (AC) source or another acceptable electrical current source. The central drive motor 46 is linked with the CPU 52, and receives speed, direction and on/off commands from the CPU. An exemplary sheet 60, which comprises a translucent developed X-ray film, is driven by the feed rollers 38 and 40, under control of the CPU 52 by the motor 46. The motor 46 is capable of both forward driving motion (arrow 61) and, opposing, rearward driving motion upon command. The pick roll assembly 44 is driven by a separate CPU-controlled motor (not shown).

Figure 2:
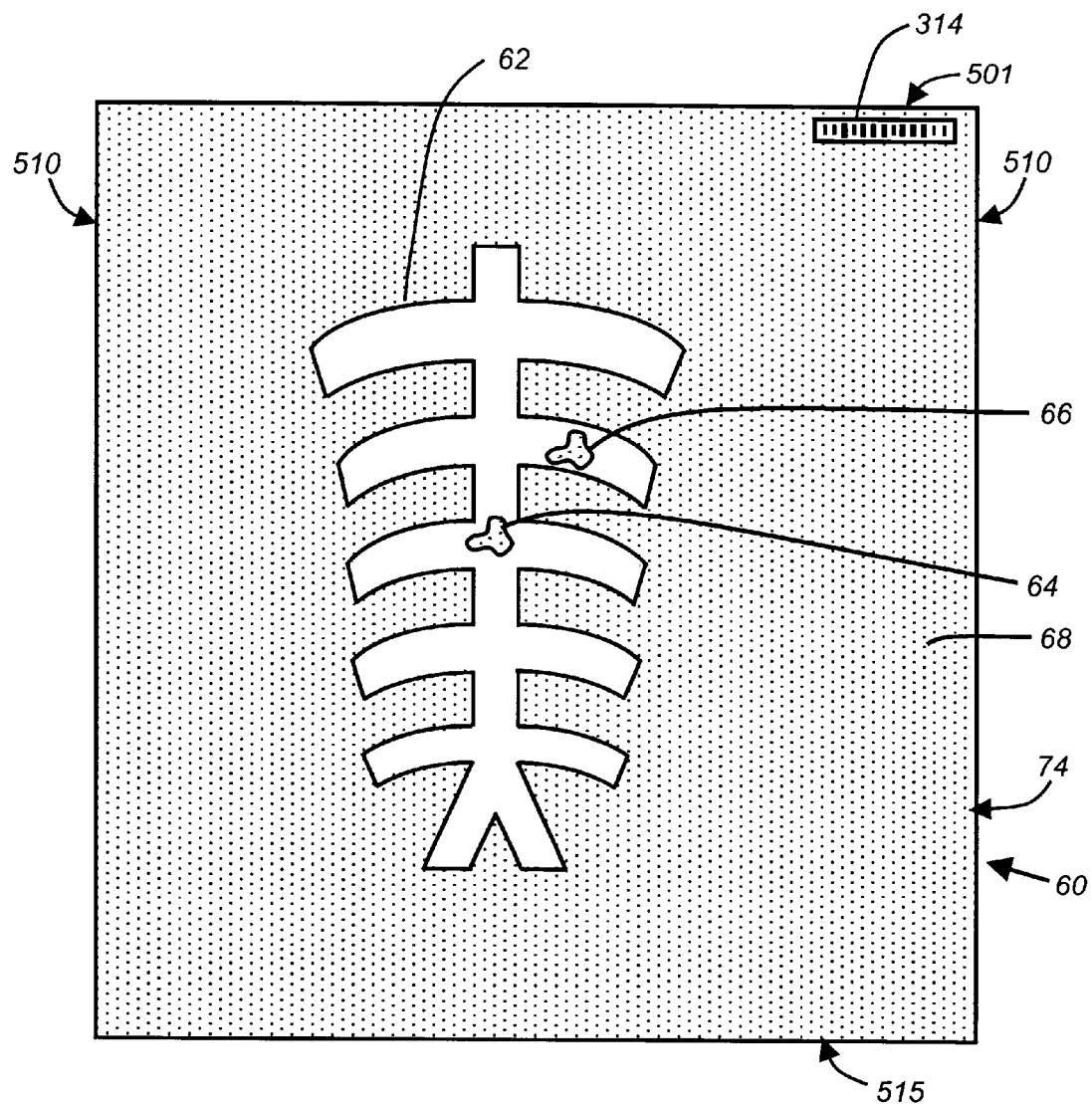
FIG. 2 is a plan view of an exemplary translucent sheet comprising a developed X-ray film.

FIG. 2 illustrates generally the exemplary developed X-ray film sheet 60. A primary radiological image 62 is shown in the center of the sheet. The image 62 is largely transparent with various dark, opaque, inclusions 64 and 66 within its boundaries. In general, the surrounding background 68 is dark and mainly opaque. The background 68 typically extends outwardly to the perimeter edge 74 of the sheet 60.

With reference again to FIG. 1 the sheet 60 is illuminated by an illumination assembly 76. Illumination assembly 76, as described further below, comprises an array of semiconductor light emitting diodes (LEDs) 78 that emit a nearly monochromatic light. The light is directed by a reflector assembly 80 and through a diffuser window 82. It passes through the sheet 60 as a diffuse beam 84 where it is received by the camera assembly 86. While not shown, a transparent platen can be located between the sheet 60 and the camera assembly 86. The camera assembly 86 of this embodiment is enclosed in a rigid sheet metal enclosure 88. An elongated (taken in a direction perpendicular to the page of FIG. 1) window 90 enables the image light 84 passing through the sheet 60 to enter the camera assembly enclosure 88. The light is reflected along an optical path through a series of reflectors 92, 94, 96 and 98, and through a focusing lens 100 to a CCD camera element 101. The CCD camera element 101 receives a line image that has been focused by the lens 100 onto the row of picture elements (CCD "pixels") extending across the element's width (taken in a direction perpendicular to the page of FIG. 1). Specifically, the CCD camera assembly includes a line of photosensitive pixels that each individually respond to light intensity with a corresponding electronic intensity signal. The CCD camera element 101 used according to a preferred embodiment of this invention comprises a Kodak KLI8013 grayscale CCD unit having approximately 8,000 CCD pixels in a line. Each CCD pixel has a size of approximately 9 microns square. The lens 100 focuses the 14-inch wide line produced by the illumination line onto a CCD element line. The lens 100 and reflectors 92, 94, 96 and 98 define an optical path that results in a viewed image pixel size of approximately 0.00171 inch square. In other words, each 9-micron CCD pixel views a 0.00171 square piece of the image, based upon the lens' ability to focus the image onto the smaller CCD element. The term pixel will be used interchangeably to describe image pixels having a 0.00171-inch size and CCD pixels having a 9-micron size. The resulting inherent resolution of a full size, 14-inch wide image is approximately 584 pixels per inch (PPI). An image is sampled by the line array every 8 milliseconds, requiring the drive to feed the sheet at approximately 0.2 inch per second (152 steps of the drive motor 46 in this embodiment) to ensure that the pixels are presented with a new line of the image each time an image is sampled. Data collected by the pixel line array CCD camera element 101 is transmitted through a data line 103 to the CPU 52 for processing.

Following a series of processing steps, the CPU transmits acquired image data over a communication line 105 to a microcomputer 107. The microcomputer 107 processes the image data according to known digitizing procedures and stores the image data in an appropriate data storage device such as a disk 109. Data can be manipulated using a user interface that can include a keyboard 111 and a mouse 113 and can be displayed on a monitor 115. Stored image can also be downloaded to other computers over a network or digitally reprinted using a telephone-connected facsimile machine.

II. Illumination Assembly

A. Array Structure and Control Circuit

Figure 3:
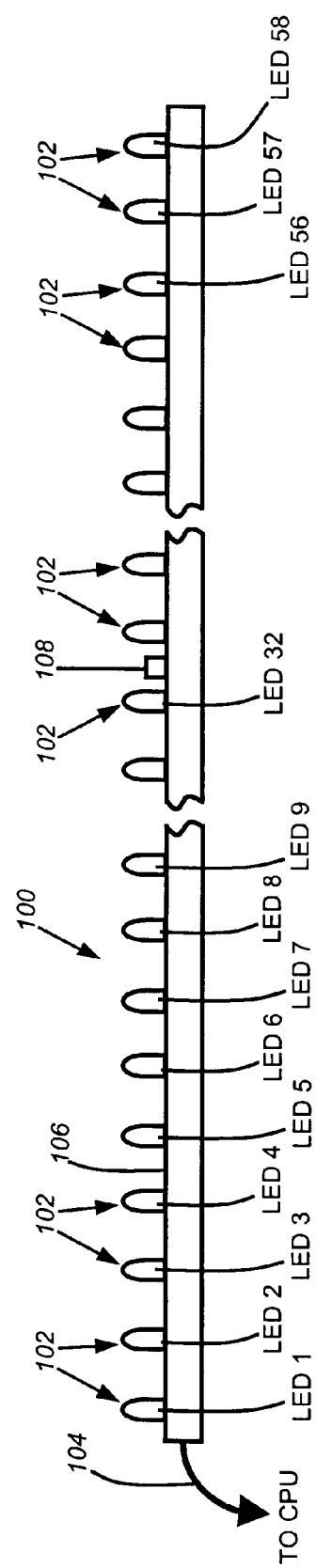
FIG. 3 is a schematic broken side view of an LED array illumination bar for use in the scanner of FIG. 1.

As discussed generally above, illumination is provided by a "bar" assembly having between 58 and 60 individual LEDs spaced across a 14–15 inch width at approximately equal spacing of 0.25 inch. A broken view of the LED bar array 100 having a plurality of individually spaced LEDs 102 is depicted in FIG. 3. In this embodiment, commercially available, red-emitting, high-output LEDs are employed. Such LEDs are rated to operate at an input current of approximately 50 mA with an approximate input voltage of 2.5 V. The output intensity can be controlled through a wide range by varying the input current. Each LED is individually powered by a wire pair (not shown) mounted to a circuit board 106 that contains the control circuitry described further below. The CPU 52 provides control signals to the LED array circuit board 106 through a control cable 104. As also described further below, a commercially available, variable output phototransistor 108 is located adjacent one of the centrally located LEDs (LED 32) in the array 100. It transmits a signal that is proportional to the light output from LED32.

Figure 4:
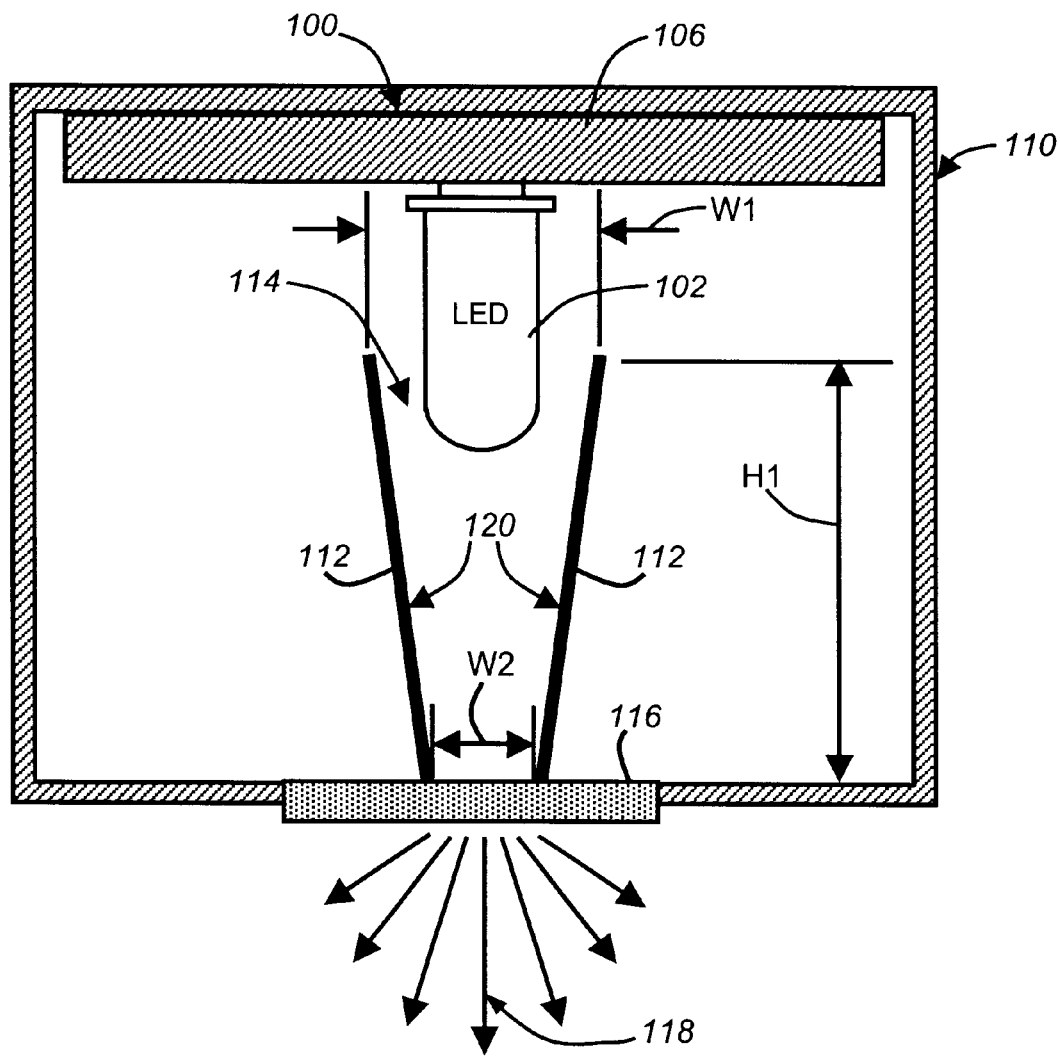
FIG. 4 is a side cross-section of a reflector and diffuser assembly for the LED array illumination bar of FIG. 3.

The LED bar array 100 is mounted in an illuminator housing 110 as detailed specifically in FIG. 4. The housing 110 can comprise a sheet metal channel or another suitable enclosure. The precise shape of the housing can be varied depending upon the geometry of the scanner interior. The LEDs 102 are directed to transmit light downwardly into a pair of elongated (perpendicular to the page of FIG. 4), tapered walls 112 that run approximately parallel to each other along their direction of elongation. In this embodiment, the LED bulbs each project partially into the enclosure of the walls 112. The walls 112 define an opening 114 at their tops to receive the line of LEDs 102, and the walls 112 are enclosed at their bottom by a translucent diffuser window 116. The diffuser window 116 is constructed from a frosted glass or synthetic such as plexiglass to project a highly diffuse light from the window 116 (see arrows 118). The inner surfaces 120 of the walls 112 are provided with a reflective film that further directs light projected from the LEDs 102. In this embodiment, the walls stand at a height H1 of 1.375 inches from the diffuser window 116. Their distance apart W1 at the opening 114 is approximately 0.25 inch and their distance apart W2 adjacent the diffuser window 116 is approximately 0.125 inch. The width and thickness of the window 116 can be varied depending upon the structural characteristics of the housing 110, but it is, typically, at least as wide as the wall spacing W2.

Figure 5:
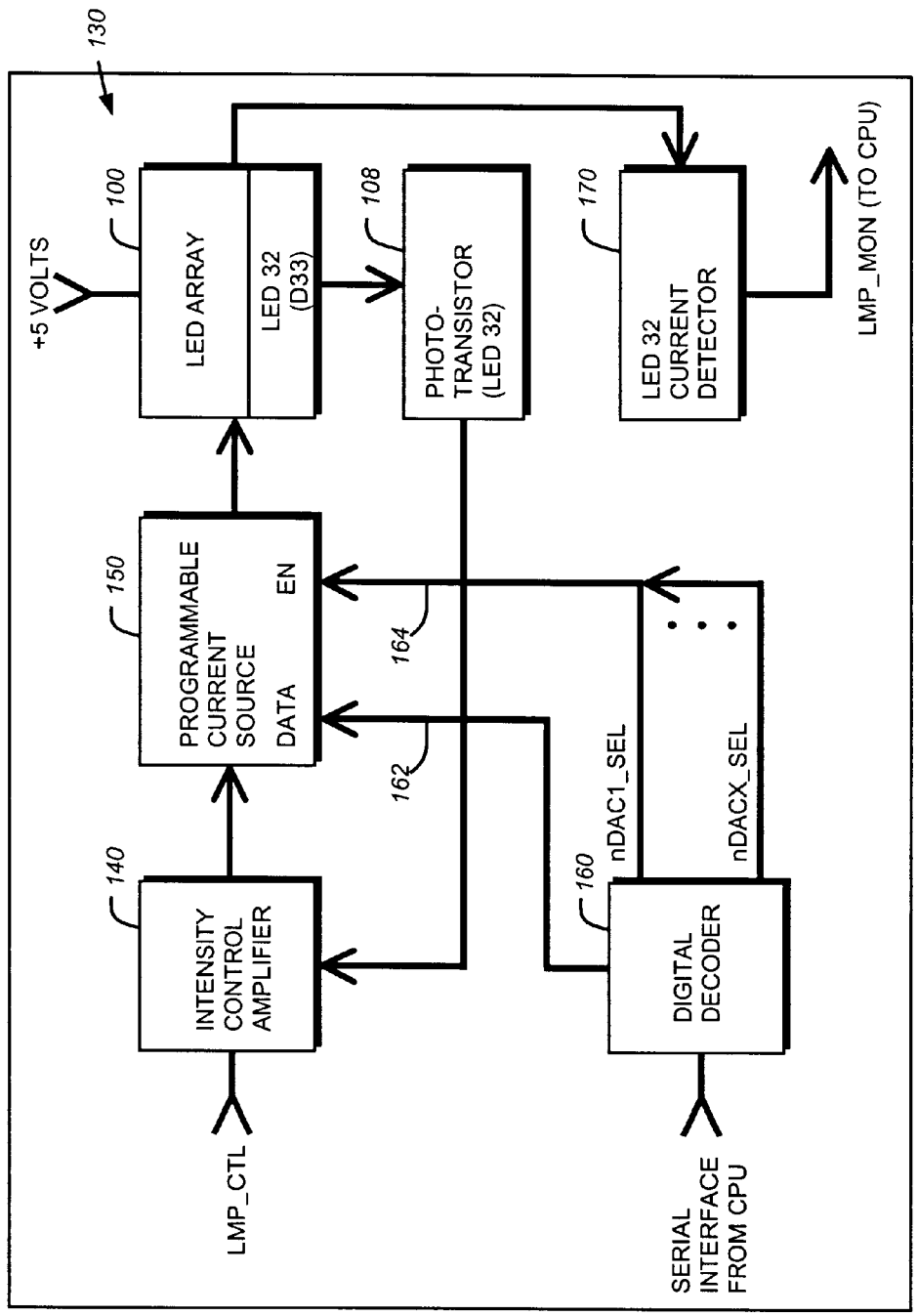
FIG. 5 is a block diagram of a control module for the LED array of FIG. 3.

Referring to FIG. 5, the LED array is operated by a LED control circuit 130. This circuit provides a regulator constant current supply for each of the 58 individual LEDs of this embodiment. Each LED is individually adjustable. It is not uncommon for LEDs to vary in intensity as much as four times relative to one another. Generally, the circuit comprises an overall intensity control amplifier 140 that receives a lamp control signal LMP_CTL of between –2.5 and +2.5 volts. The intensity control amplifier regulates the overall input voltage to the entire array 100. The intensity control amplifier 140 also receives an input signal from the phototransistor 108 adjacent the 32nd LED in the array (LED32 in FIG. 3).

The intensity control amplifier transmits an overall voltage signal to the programmable current source 150 which comprises a group of corresponding individual digital/analog converters that generate a controlling output voltage for each respective LED. The programmable current source, using the intensity control amplifier signal as a reference, modifies the driving voltage for each individual LED in the array 100 based upon control input signals received from the CPU through a digital decoder 160. The digital decoder enters control data through a data line 162 and selects the LED's specific digital/analog converters using a select/enable line 164. An LED32 current detector 170 generates a lamp monitor signal LMP_MON that returns a measurement of intensity for LED32 to the CPU 52.

Figure 6:
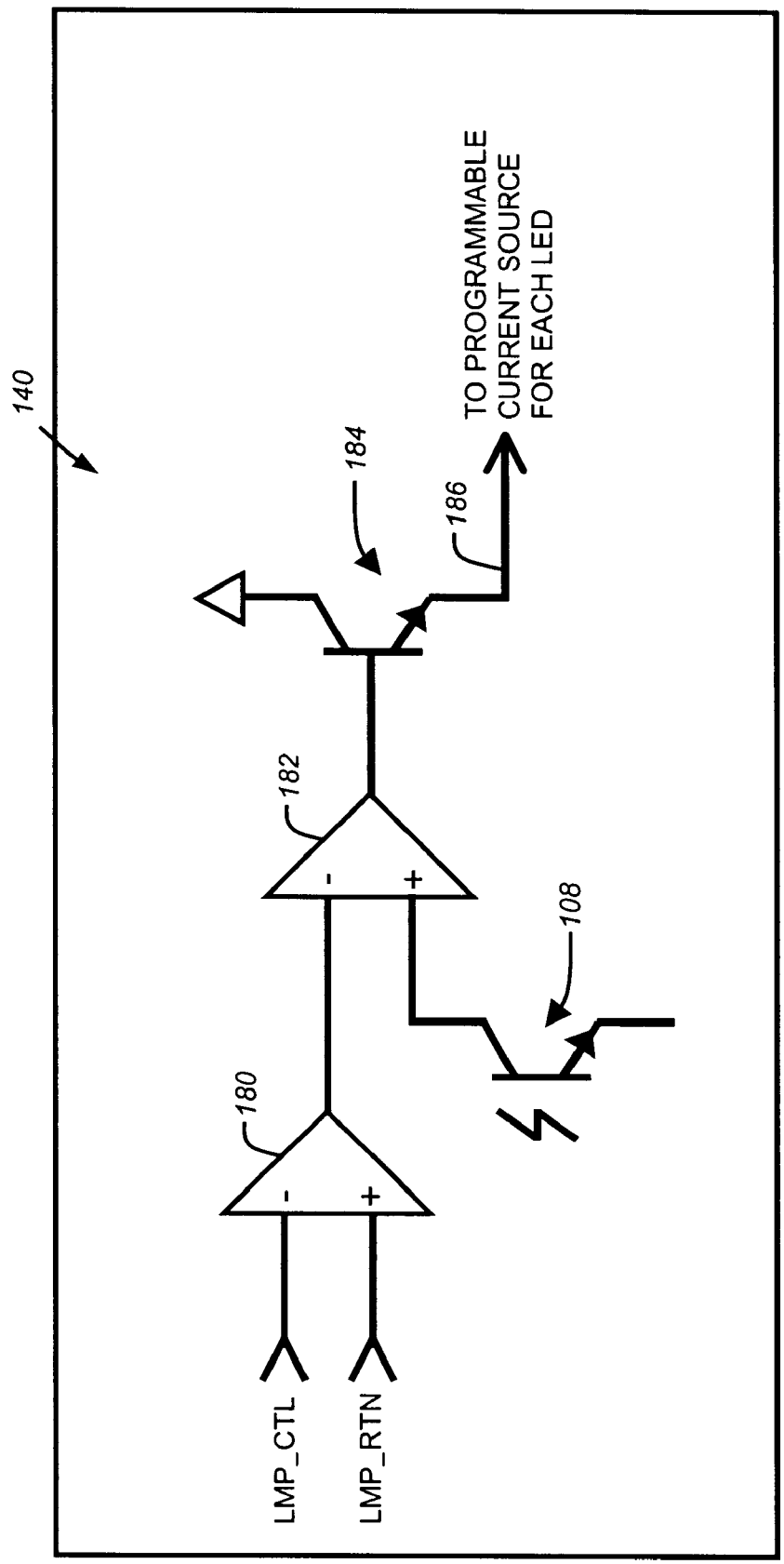
FIG. 6 is a schematic circuit diagram of an intensity control amplifier for each LED in the array of FIG. 3.

As detailed in FIG. 6, the intensity control amplifier 140 resides on the array circuit board 106. The intensity control amplifier 140 comprises a differential amplifier 180 that receives inputs from the lamp intensity control signal LMP_CTL and also from a reference signal LMP_RTN. LMP_RTN is generally a grounded signal, designed to correct for transmission losses experienced by the control signal LMP_CTL. The output of the differential amplifier 180, comprising a corrected control signal is provided to an integrating difference amplifier 182. The output of the phototransistor 108 is compared to the resulting intensity control signal by the amplifier 182, and the resulting value passes through a common emitter transistor buffer 184 which is sufficient to provide an adequate current to drive all of the digital/analog converters in the array. The output signal 186 of this buffer 184 is routed to the various digital/analog converters on the circuit board 106 of the LED array.

Figure 7:
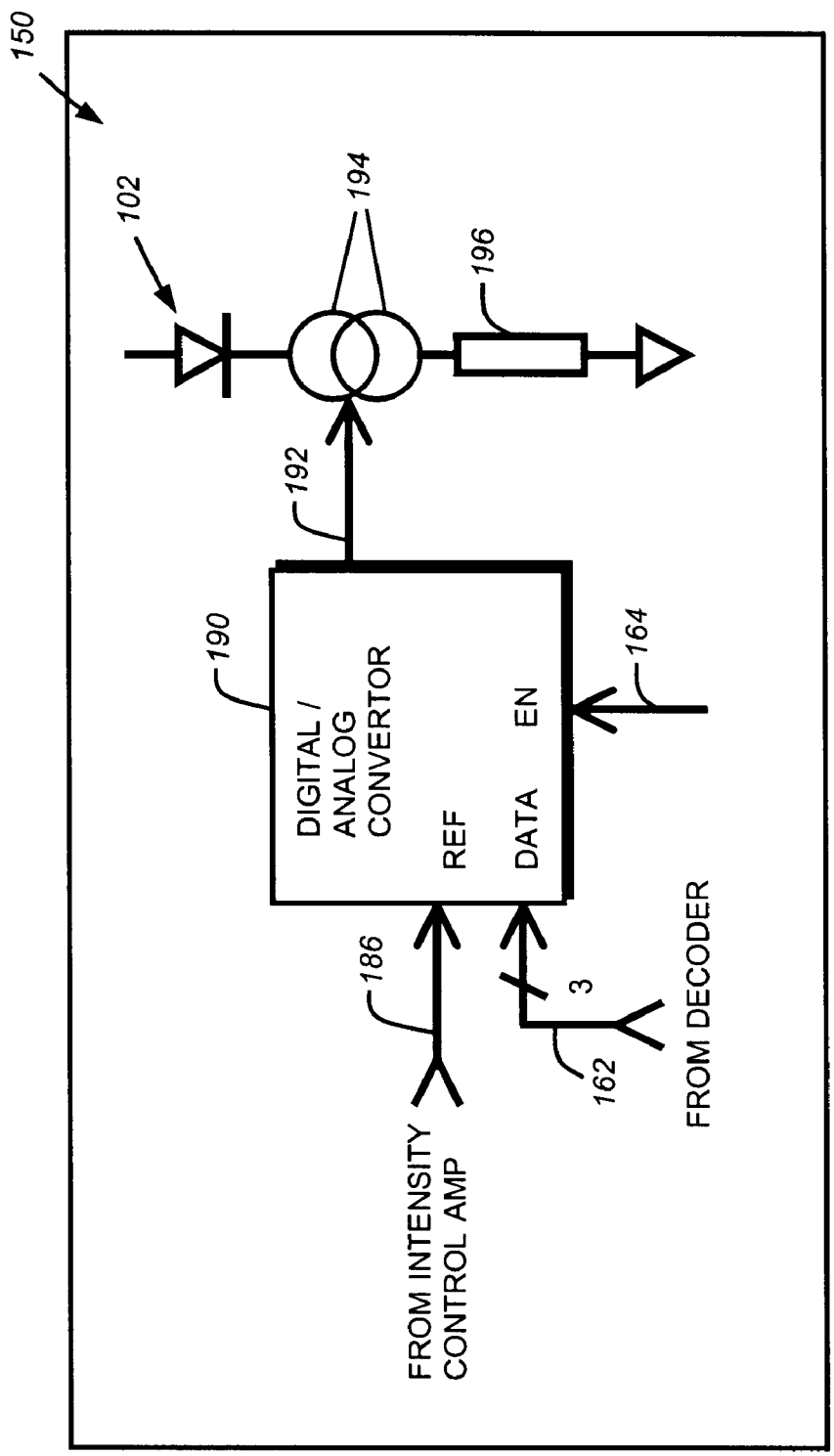
FIG. 7 is a schematic circuit diagram of a programmable current source for each LED in the array of FIG. 3.

The digital/analog converters are part of the programmable current source block 150, which is further detailed in FIG. 7. The signal 186 from the intensity control amplifier is provided as a reference voltage to each digital/analog converter 190. A three-bit data line 162 provides individual LED control signals from the decoder 160 (FIG. 5) and serial interface of the CPU 52. A specific enable signal EN is also provided by the decoder through line 164 to activate each digital/analog converter 190. Typically, eight digital/analog converters are provided on a single integrated circuit chip package. Seven digital/analog converter chips are used in this embodiment, with the first two LEDs (LED 1 and LED2) and the last two LEDs (LED57 and LED58) operating in tandem. This arrangement, however, is chosen merely based upon cost considerations, and it is contemplated that each and every LED can be operated by a discrete digital/analog converter according to this invention. Likewise, groups of LEDs can be operated by a single digital/analog converter in an alternate embodiment.

The digital/analog converter 190 for each LED generates an output voltage $V_{out}$, based upon the reference voltage $V_{ref}$ that is multiplied by an 8-bit digital word received from the data line 162. In other words $V_{out}=V_{ref}$ (CONTROL/256) where CONTROL is a digital value between 0 and 255. A pair of transistors 194 configured to form a common emitter buffer amplifier receive the $V_{out}$ signal. Using a 49.9 ohm set-resistor, a variable LED driving current $I_{LED}$ is provided to the LED 102. $I_{LED}=V_{out}/49.9$ according to this relationship. Hence, a $V_{out}$ equal to 0.625 volts produces a nominal LED current of 12.5 mA. A 12.5 mA current is the target value desired for initially calibrating LED32.

Figure 13:
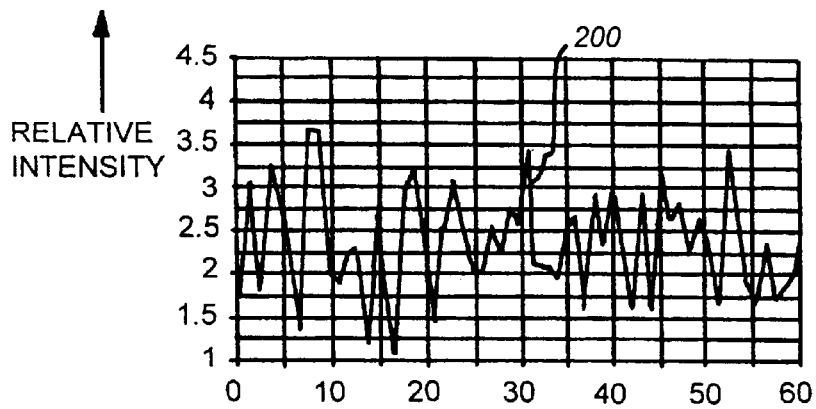
FIGS. 13–17 are graphs that showing, progressively, the output of each LED in the bar array at various stages of the calibration process.
Figure 14:
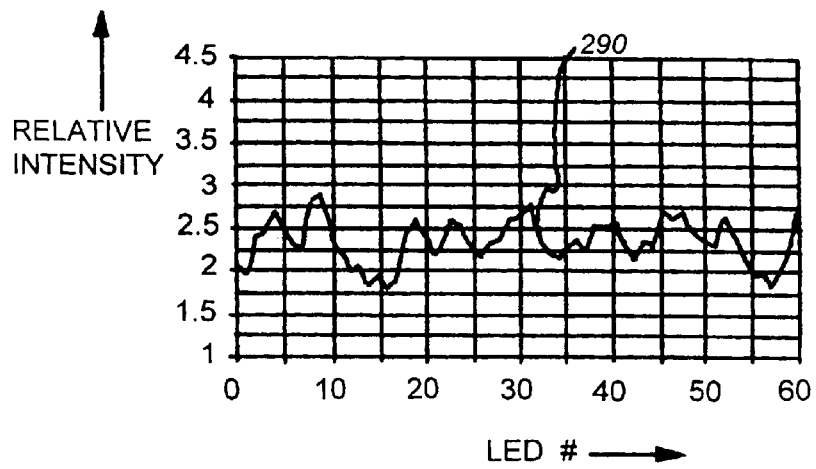
Figure 15:
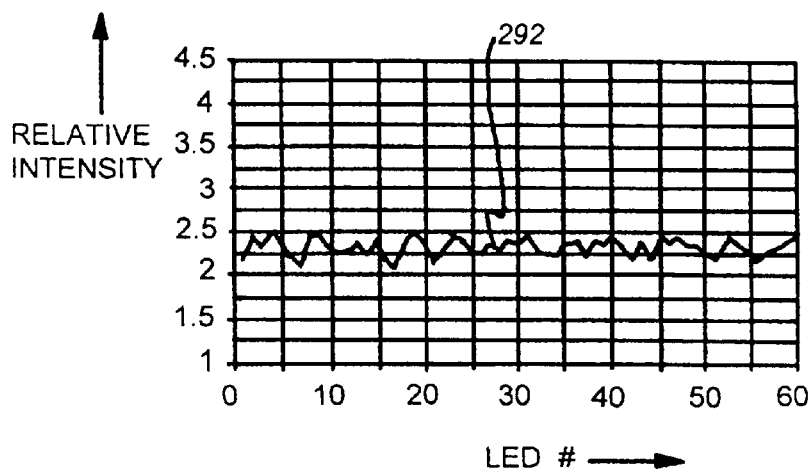
Figure 16:
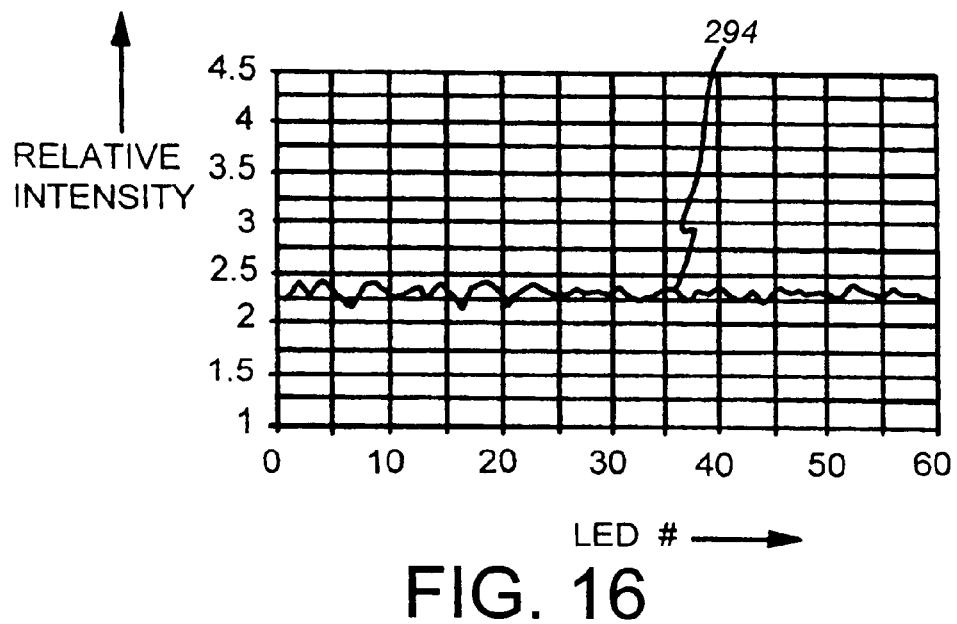
Figure 17:
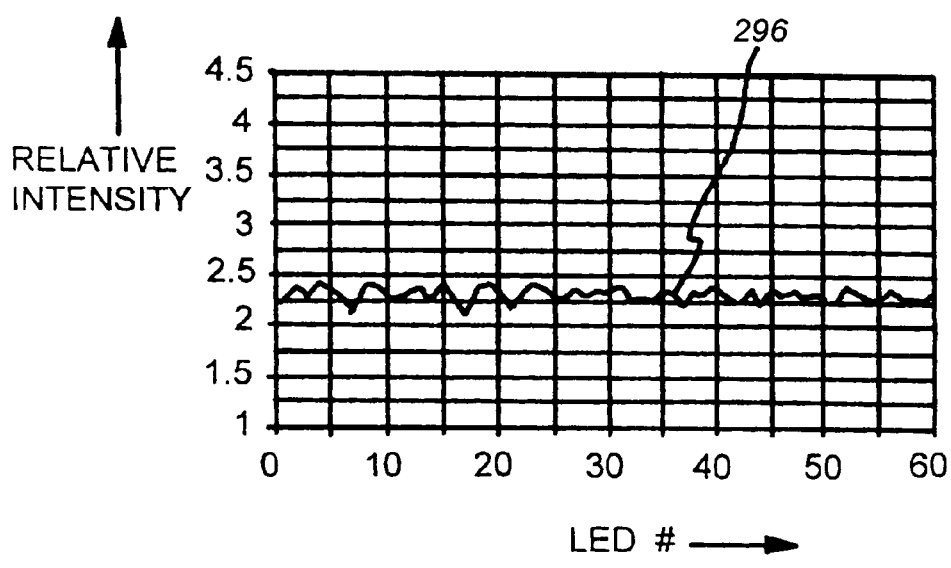

As discussed above, it is not uncommon for LEDs to have a brightness/intensity variation of as much as 4:1 for any two LEDs in a grouping. This variation can result in wide deviations in illumination characteristics for a given array of LEDs. See, for example, the distribution curve 200 of FIG. 13 (described further below) which shows relative intensity values for a given array of unadjusted LEDs all driven at constant current and voltage in a scanner according to this invention. The curve 200 shows wide variability between adjacent LEDs. Note that the curve 200, and the other calibration data derived herein are based upon the light pattern received by the CCD camera assembly 86 (FIG. 1) used for the scanner of this embodiment.

Note that, for a given intensity of light, the individual CCD pixels may exhibit a non-uniform response. In other words, the output signal of each CCD pixel may be slightly different due to manufacturing variations in each CCD pixel. Some variations in individual CCD pixel output are compensated for by calibrating the CCD camera element output. The architecture of the LED array enables further adjustment for nonuniformity in CCD pixel output and in non-uniformities in the optical system by allowing the local intensity of light in the scanned line to be raised and lowered. The ability to adjust the local intensity of light, by adjusting individual LEDs is used, for example, to compensate for the loss of exposure at edges of the image width. As noted above, the focus lens 100 generates the above-described COS$^4$, wherein LEDs near the outer edges of the field of view (e.g., LEDs near LED1 and LED58 in FIG. 3) are viewed as dimmer by the CCD element. The calibration procedure to be described below, in fact, compensates for such inherent variability in the optical system by raising the output of the LEDs near the outer edges. By adjusting the individual LEDs to desired levels, the CCD pixels each transmit an intensity signal that falls within a uniform range.

B. LED Array Calibration and Adjustment Procedure

Figure 8:
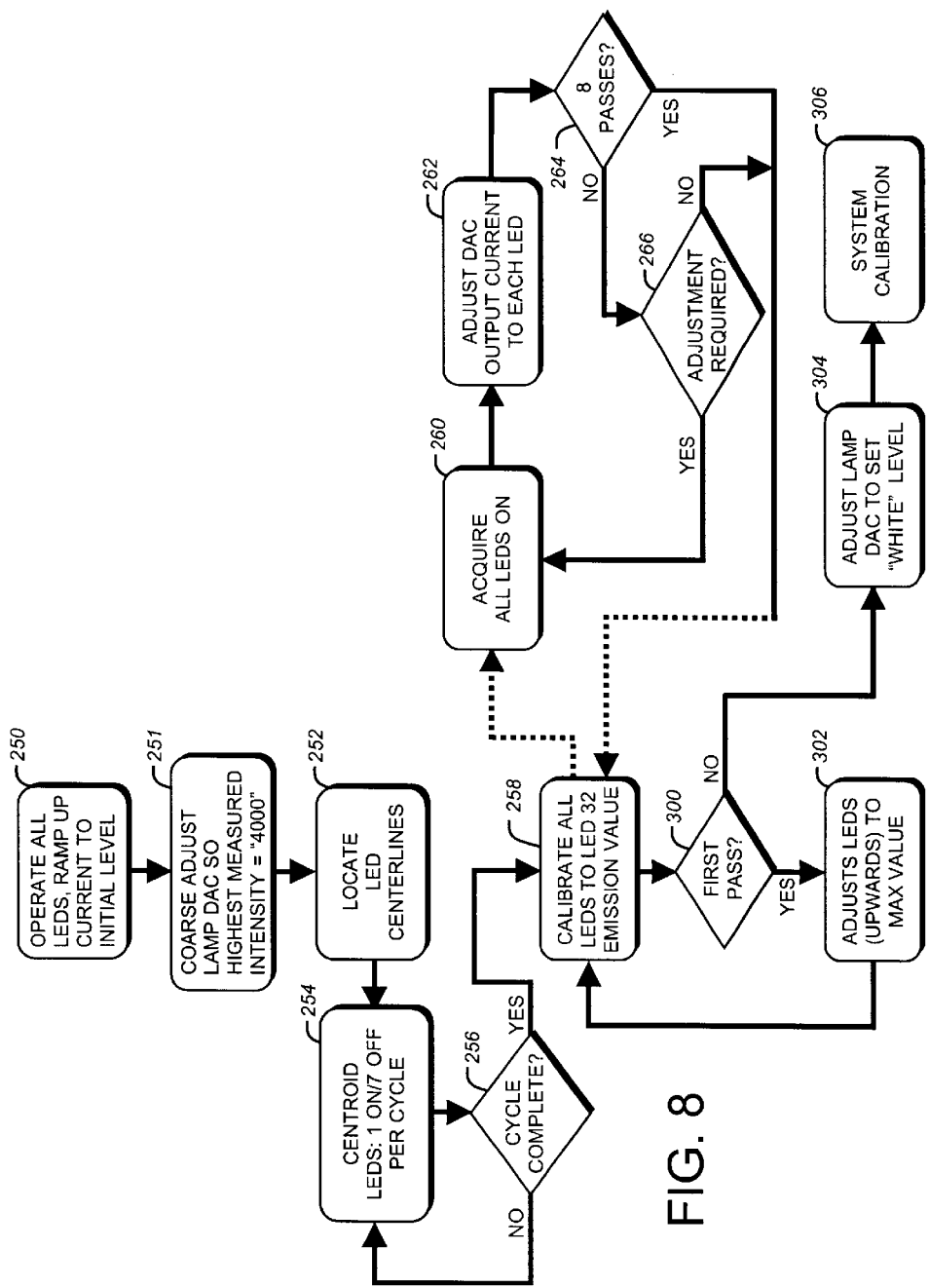
FIG. 8 is a flow diagram depicting an LED array calibration procedure according to this invention.
Figure 12:
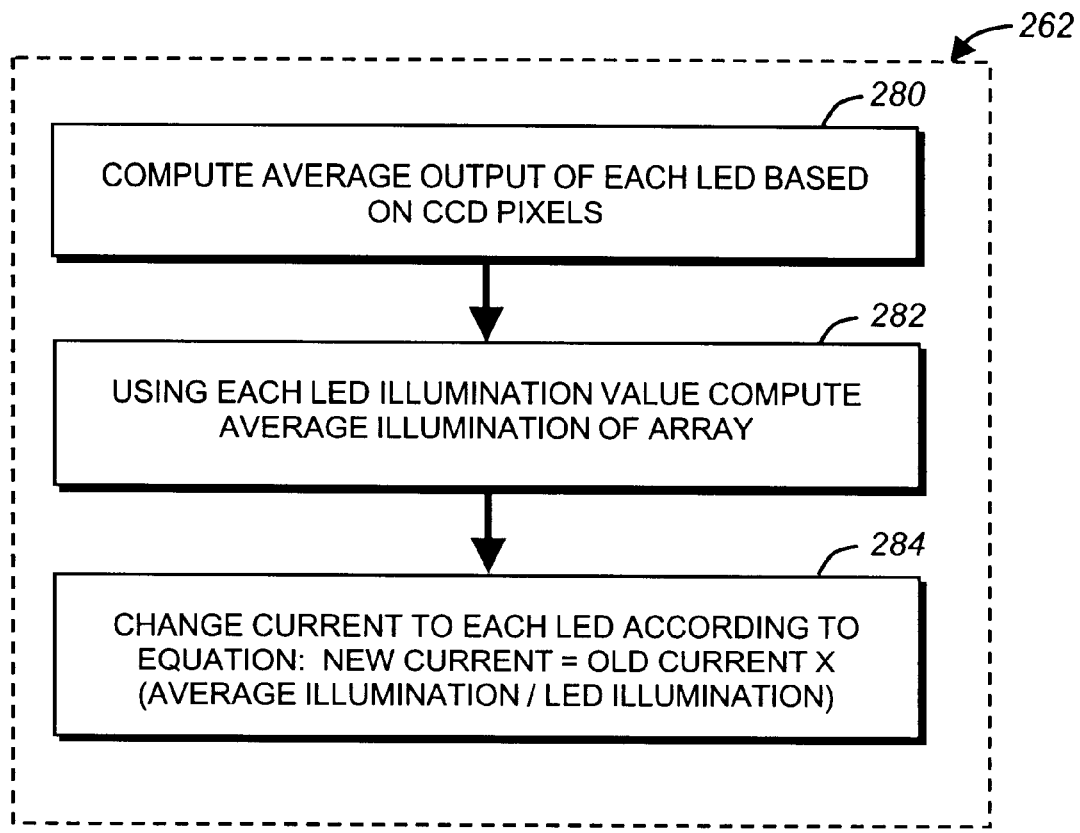
FIG. 12 is a more-detailed flow diagram of an LED-intensity adjustment procedure for the calibration procedure of FIG. 8.

Referring specifically to FIGS. 8 and 12, an illumination assembly calibration procedure is detailed. Reference will also be made, generally to FIGS. 13–17 which detail an actual measured response curve for an illumination assembly of this embodiment as viewed by the CCD camera assembly of this invention. Upon scanner system start-up, the illuminator activates all LEDs in step 250. Start-up can comprise a simultaneous ramping-up of the digital control input to each of the LED digital/analog converter circuits in each respective programmable current source until transition in each digital/analog converter has occurred. Analyzing the output received by the CCD camera assembly, the CPU inputs an intensity control signal LMP_CTL to adjust all LEDs so that the highest value CCD pixel intensity does not exceed a predetermined maximum value in step 250. In this embodiment, a measured CCD pixel output value of "4,000" (as recognized by the Kodak KLI8013 grayscale CCD unit) is considered the maximum allowed intensity value. The value 4000 is considered to represent a pure "white" output on the CCD grayscale (described further below). The maximum intensity value can be varied based upon the make and type of camera element being used. As this coarse adjustment stage of the calibration procedure, all LEDs are operated at a substantially equal, coarsely adjusted input current and voltage to their respective programmable current sources.

Subsequent to the coarse adjustment step 251, the individual LEDs in the array are located based upon where they are viewed within the CCD element. In other words, each of the illuminated LEDs is mapped to a particular group of pixels in the line array of the CCD. Specifically, the mapped pixels are averaged to determine the center line or "centroid" for each LED. The procedure for mapping LEDs to pixels is described in steps 252 and 254 and in decision block 256 of FIG. 8, which are described further below.

Figure 9:
FIGS. 9, 10 and 11 are schematic broken plan views of the LED array illumination bar of FIG. 3 detailing an incremental shift procedure for calibrating the intensity of each LED.
Figure 10:
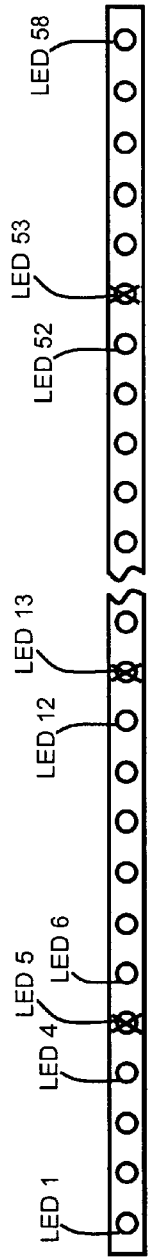
Figure 11:
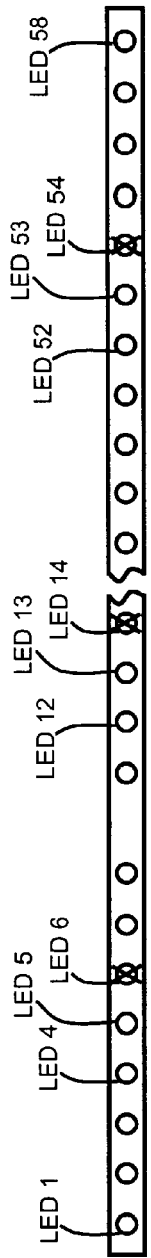

FIGS. 9, 10 and 11 schematically illustrate the operation of the LED array bar during the centroid location procedure outlined in main calibration procedure steps 252, 254 and 256. To determine which pixels correspond to each LED center line, LEDs are switched on and off such that only LEDs spaced eight positions apart from each other are on at any given time. This eight-LED spacing is generally sufficient to reduce "crosstalk" between light patterns. In other words, discrete groups of pixels on the CCD element will receive the light transmitted by each spaced-apart LED without receiving substantial light from adjacent LEDs. In FIG. 9, LED4, LED12 and a succession of further spaced-apart LEDs up to and including LED52 are switched on. Each LED outputs light at the coarsely adjusted maximum intensity level. The CPU reads the location of the pixels showing the maximum intensity for this set of LEDs. The CPU determines the pixels outputting the maximum intensity and correlates these intensity readings with the "location" of the particular LEDs. This location on the CCD array is stored as the centroid position for the LED being addressed. The CPU assumes that LEDs will illuminate pixels in the same spacing pattern as the LEDs are positioned in the bar. Hence LEDs are identified in an order corresponding to the order of illuminated pixels in a widthwise row across the CCD array (e.g. leftmost illuminated pixels must be LED4, next to the right must be LED12, and so forth . . . .)

Next, in FIG. 10, the illuminated group shifts so that LED5, LED13 and the succession of spaced-apart LEDs up to LED53 are switched on. The CPU again records the centroids corresponding to the addressed LEDs as described above.

In FIG. 11, LED6, LED 14 and a succession of spaced-apart LEDs up to, and including, LED54 are then switched on, and the corresponding pixels are identified. This process continues through eight iterations until all LEDs have been correlated to particular pixels in the CCD element. When the cycle is complete, the decision block 256 (FIG. 8) routes the procedure to the next step in the main illuminator calibration process.

In step 258 of the main calibration process (FIG. 8), all LEDs are again illuminated, and the output of LED32 is read using the phototransistor 108 (FIGS. 3 and 6). This output value is used to establish a baseline emission value for the given current input to LED32. LED32 is deemed to provide an appropriate level of light output/intensity for the array, as a whole. The output current generated by the phototransistor in response to LED32 is translated by the current detector 170 (FIG. 5) into the signal LMP_MON. The emission value of the phototransistor is used as a reference by the intensity control amplifier 140 (FIGS. 5 and 6). Based upon this reference, all LEDs are now readjusted in steps 260 and 262 and decision blocks 264 and 266.

The adjustment of the output intensity of individual LEDs in step 262 occurs in a series of passes. Note that each LED is assigned an 8-bit output level according to this embodiment, enabling 256 different settings for each LED. Passes are employed since each LED will have a certain amount of effect on the measured intensity of adjacent LEDs. The effect of each LED on its neighbors varies depending upon (1) the angle (however slight) at which each LED is slanted; (2) the optical characteristics of each LED-how it projects its light; and (3) inconsistencies in the bar's diffuser window and tapered, reflective walls. In this embodiment, decision block 264 is instructed to end the procedure after eight passes which is considered sufficient to adequately smooth variations in intensity output. Prior to eight passes decision block 266 determines whether further adjustment is required or if all LEDs have a measured intensity that falls within a predetermined range. For each pass, the adjustment of the individual digital/analog converters for each LED in step 262 occurs according to the adjustment procedure more-particularly detailed in FIG. 12. First, the intensity value for each LED is computed by averaging the value for its adjacent LEDs in step 280. The value for each LED, again, can be determined since the CCD element pixel corresponding to the centroid for each individual LED are known the intensity presented to those pixels can be measured. Using the measured intensity value for each LED, as derived from the averaging processing in step 280, the average illumination of the entire array is computed in step 282. Finally, the current input to each LED can be varied (via its respective digital/analog converter) according to the following relationship set forth in step 284:

NEW_LED_CURRENT=OLD_LED_CURRENT•(AVERAGE_ARRAY_INTENSITY/LED_INTENSITY).

Referring to FIGS. 14, 15, 16 and 17, the respective curves 290, 292, 294 and 296 show the relative response of the CCD element to the individual adjustment of each LED in the array through one, two, three and four respective passes of the procedure. Clearly, the measured response of the CCD element is flattened substantially as the measured output of each LED is equalized with the desired standard intensity value. Further passes (not shown) result in even lower variation between LED intensities up to the maximum of eight in this embodiment.

Once the calibration of LEDs relative to each other is completed in step 258, the main calibration procedure (FIG. 8) proceeds to decision block 300. The procedure queries whether multiple passes have occurred. If only a single pass has occurred, all LEDs are adjusted upwardly to their maximum value in block 302 and calibration step 258 is performed again. The ensures that the array has been properly calibrated. It is possible that only one pass was taken because the outputs of the LEDs were too dim to obtain an adequate measurement. If more than one pass has occurred, then the decision block 300 branches to the white level adjustment step 304. The intensity control amplifier 140 (FIGS. 5 and 6) is adjusted by the CPU so that an appropriate white level is attained by the pixel array as a whole after it has been adjusted. Again, a pixel intensity value of 4,000 (corresponding to a 5-volt digital/analog converter value as recognized for the commercially available Kodak CCD unit of this embodiment) is desirable according to this embodiment. Following the white level adjustment step 304, overall system calibration is undertaken in step 306 in which the newly adjusted illumination level is stored by the CPU as maximum white and the darkest level is stored as black. Maximum black is generated by shutting down the LED array. An advantage to using an LED array is that it can be quickly shut down and reactivated. All intensity values in between maximum light and maximum black are read at the CCD output with 12-bit resolution.

It is contemplated that further detection devices and procedures can be provided through the illumination assembly of this invention. For example, calibration of individual LEDs can occur one-at-a-time by cycling each LED on and off in succession and measuring the relative intensity. In this manner, the effects of adjacent LEDs are minimized and failures in individual LEDs can be readily identified. However, calibration with all LEDs simultaneously activated is preferred because cross-talk between adjacent LEDs may be non-uniform. By activating all LEDs at once the effect of non-uniform cross talk can be accounted for in the adjustment process. Several iterations or "passes" can be required to adjust the LED array according to this embodiment to address the effect of this cross-talk by "smoothing" the overall light-output curve of the array.

C. Optional Illuminator and Function

With reference again to FIGS. 1 and 2, an optional illuminator 310 is located between the sheet 60 and the CCD camera element. The illuminator 310 is oriented at a arbitrary angle relative to the perpendicular beam 84 entering the CCD element from the illuminator assembly 76. This orientation prevents the illuminator 310 from interfering with the beam 84. In particular, the illuminator 310 should be oriented to reflectively illuminate a predetermined width of the side edge of the sheet 60. The sheet 60 includes, along the right side of the upper edge 312 an opaque bar code strip 314. It is often desirable to provide opaque, self-adhesive bar code strips and other identifiers to developed X-ray film and other translucent or transparent sheets for identification purposes. These strips are typically added after the film is developed. The illuminator 310 is directed to selectively illuminate this strip. When the sheet is placed with the strip face down (e.g., facing the camera assembly 86) the array illuminator 76 cannot effectively illuminate the opaque strip 314. Hence, the illuminator 310 provides a reflected light from the same side as the strip 314. The CPU controls the illuminator so that it provides the light as the front edge 312 passes into the field of view of the camera assembly 86. A digitizer within the CPU or microcomputer can store and decode the information contained on the strip 314 using known procedures for analyzing graphical, text and bar code data. In the above-described manner the illuminator light does not interfere with the reading of the main body of the film, and the read information is located on a marginal part of the film that is largely unused and that does not obscure the central image. The illuminator can be constructed from one or more LEDs or from another light source such as a neon or halogen incandescent bulb. The projected light should be sufficient so that an opaque strip can be read through its reflected light.

III. Camera Assembly

A. Camera Assembly Structure and Function

Figure 18:
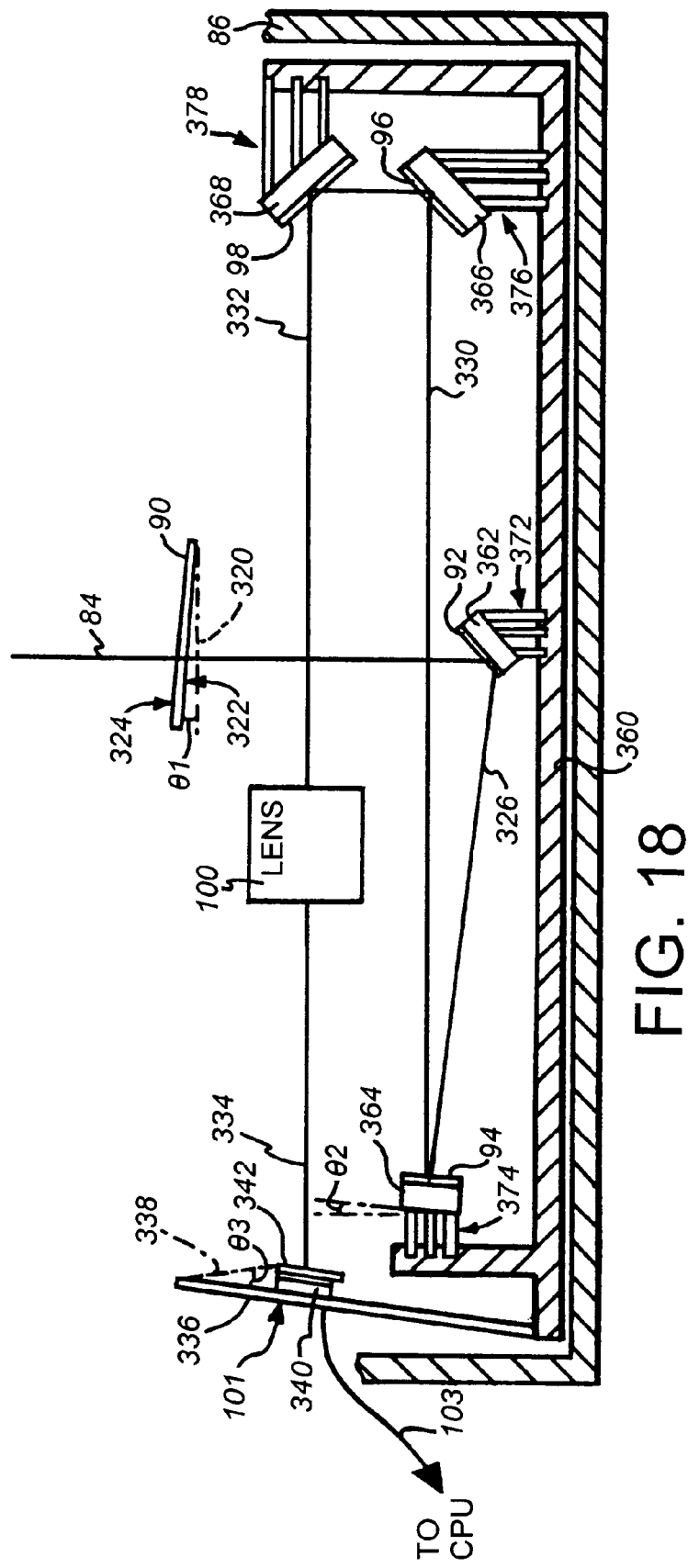
FIG. 18 is a somewhat schematic side cross-section of the camera assembly for the use in the scanner of FIG. 1 detailing the reflector and lens arrangement.

The camera assembly 86 (FIG. 1) is provided a self-contained unit according to this embodiment. Referring to FIGS. 1 and 18, the beam of image-attenuated illumination light 84, which generally defines a thin, elongated projection (elongated in a direction perpendicular to the page and corresponding to the width of the illuminator) first passes through an outer dust window 90. According to this embodiment, the dust window is tilted at an angle $\theta 1$ relative to the plane 320 of the housing top surface. The angle $\theta 1$ is generally between 7° and 15°. By tilting the dust window 90 at a non-perpendicular angle, reflections off its inner surface 322 are directed away from the optical path of the image beam 84. Likewise, reflections off the top surface 324 are deflected away from the scanned portion of the sheet 60. The surfaces of the dust window can be provided with an anti-reflection coating to further minimize bounce-back of image light.

The image beam 84 strikes an elongated (in a direction perpendicular to the page) reflector 92 located near a 45° angle to the incident image beam 84. The resulting reflected beam 326 strikes a second reflector 94 located at a slight angle $\theta 2$ to the vertical plane 328 of the housing (the vertical plane 328 being parallel with the incident image beam 84) the slight angle $\theta 2$ causes the angled reflected beam 326 to be transmitted perpendicularly to the plane 328 as a second reflected beam 330. The second reflected beam strikes two 45° reflectors 96 and 98 to be re-reflected as a parallel beam 332. The beam 332 passes through a focusing lens 100 that, in this embodiment, comprises an F/6.2 objective lens. The lens 100 provides a focused, properly sized image at the plane defined by the surface of the CCD camera element pixel array. As the image moves relative to the camera, the CCD pixels eventually sample the entire image (line-by-line).

The CCD camera element 101 is mounted on a support member 336 at one end of the housing 86. Specifically, the CCD element 101 comprises the exposed photosensitive CCD pixel array 340 and a transparent covering window 342 positioned in front of the array. The pixel array 340 and window 342 are fixed together as a unit according to this embodiment. Both the pixel array 340 and the window 342 are arranged on the support member to be tilted at an angle $\theta 3$ relative to a plane 338 passing perpendicularly through the focused optical path 334. The angle $\theta 3$ is also between 7° and 15°. In other words, the camera 340 and covering window 342 are disposed at a non-perpendicular angle relative to the incident light striking them. By tilting the camera and window into a non-perpendicular orientation relative to the optical path, reflections of incident image light back into the optical pathway are minimized. The angle does not substantially affect the detected image, and hence, is acceptable for scanning purposes.

It should again be noted that the reflectors, 92, 94, 96 and 98 each have a width sufficient to accommodate a full-width scannable image. Since these reflectors are generally long and thin, they are prone to experience strain that may distort the reflector shape and degrade image quality. According to a preferred mounting procedure, the reflectors are assembled as part of a base frame 360 constructed from a rigid material such as metal or plastic that retains all components of the optical system. In particular, the reflectors 92, 94, 96 and 98 are each mounted on a respective mounting base 362, 364, 366 and 368 that each are, likewise, secured to the base frame 360 by respective support member mounts 372, 374, 376 and 378. Each reflector is typically secured to its mount by adhesive. The mounts are each secured to the base frame at a predetermined mounting location by nuts, bolts or other adjustable fasteners that enable adjustment of the reflectors to optimize their positioning.

B. Camera System Enhancements and Output Signal Improvement

1. Dynamic Noise Suppression

By way of background, the dynamic range of an image is the measure of the difference between highlights and shadows. It is defined as a function of the density and the noise. The dynamic range (DR) is the logarithm of the signal-to-noise ratio of the system. Deriving its value in the logarithmic domain, it is represented as DR=Density+Log(0.4343/image noise); where density is a "grayscale" value ranging from 0.0 at maximum highlight and 4.0 near the shadow limit; and the image noise is expressed as a root-mean-square (rms) density noise value. For example, a density of 3.0 with an associated noise level of 0.21 results in a dynamic range of 3.3.

When an image is processed by a CCD and associated circuitry, the nature and quality of highlights can be controlled by regulating the amount of light illuminating the image. However, the dynamic range is significantly effected by noise in the shadow range. In a conventional electronic imaging system, maximum light corresponds to the maximum allowable electronic signal while absence of light corresponds to the minimum electronic signal. There is an approximately linear relationship between bright and dark as exhibited by the output signal from the CCD. When a low-level electronic signal is produced, the effect of background noise becomes markedly more pronounced since the noise level is approaching the output signal's normal amplitude.

Figure 19:
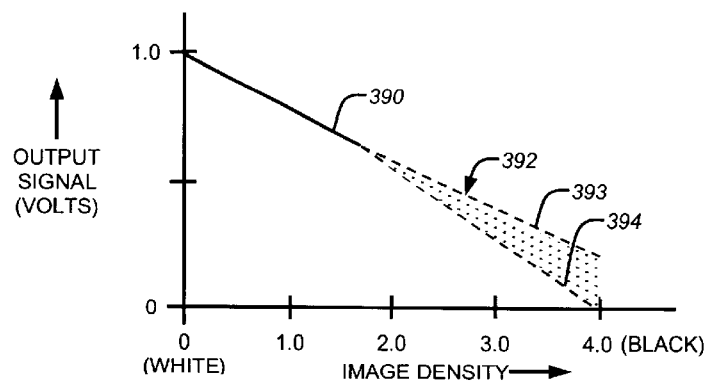
FIG. 19 is a graph showing the presence of electronic noise at low-light response levels in an unfiltered CCD camera circuit according to the prior art.

FIG. 19 graphically represents a typical signal response curve 390 for an unmodified CCD imaging system for output signal voltage versus shadow density (where 4.0 corresponds to a very dark shadow). The largely linear response curve 390 exhibits a significant and increasing noise range 392 once grayscale density (e.g., shadows) exceeds approximately 2.0 density. The curve 390 forms a widening band of deviation 393 from the expected linear response curve 394 (shown in phantom). This electronic noise is exhibited by uncertain pixel output values.

Electronic noise in the system is a function of the rate at which data is transmitted and the so-called "bandwidth" of the electronic signal. The signal noise level (Vnoise) is proportional to the mathematical square root of the bandwidth. The data rate is typically fixed based upon system design requirements for a given resolution. Conversely, bandwidth is variable for a given resolution, and its attenuation can be used to control noise. However, bandwidth is a function of system response and determines how accurately the system will respond to a change in brightness of the image. A narrower bandwidth, therefore, degrades the ability of the system to respond to rapid changes in image brightness.

In general, the dynamic range of the system is limited by the noise level of the signal. The magnitude of the noise level is a function of the bandwidth and the signal varies as the square root of the bandwidth. Hence, reducing the bandwidth of the signal reduces the magnitude of the noise level. There is a practical limitation to the amount which bandwidth can be reduced because the information contained in the image signal is directly proportional to the bandwidth. Therefore, there is a tradeoff between the required information rate and the signal bandwidth.

The bandwidth of the output signal in the high intensity region is largely fixed by scanner design and performance characteristics. An example of a high intensity region detail in a developed X-ray film, for which accurate reproduction is desired, is a thin, hairline fracture appearing as a narrow dark line surrounded by the white of the fractured bone. A wide bandwidth that facilitates rapid response to contrast changes is, therefore, desirable for such a region. In general, low-intensity (shadow) regions are less dependent upon reproducing details with high contrast. For example, shade changes in the dark background are irrelevant, and the specific changes in tone within the line of the fracture do not usually provide easily readable detail. Therefore, the bandwidth of the signal in the low-intensity, dark regions can be narrowed within certain parameters without degrading the image.

Figure 20:
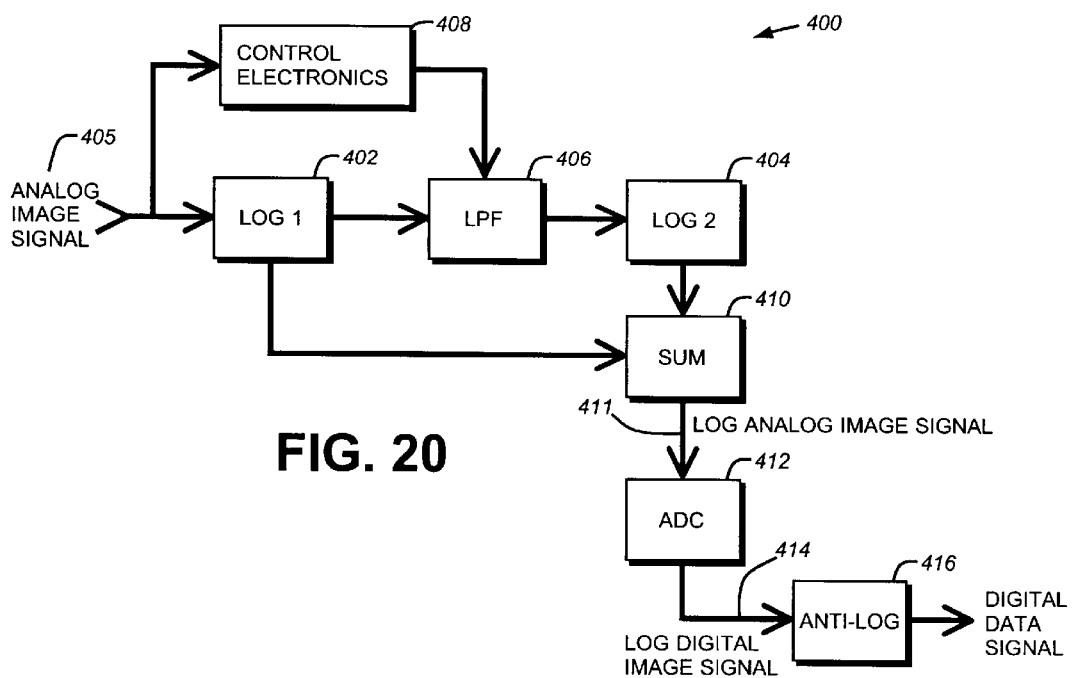
FIG. 20 is a block diagram of a dynamic noise suppression circuit for use with a CCD camera circuit according to an embodiment of this invention.

FIG. 20 illustrates a noise suppression circuit 400 that dynamically adjusts the signal bandwidth of the system based upon the content of the incoming image signal. This circuit 400 enables the dynamic range of the signal (based upon the signal's Vmax and Vmin) to be increased with a minimal effect on the underlying image data since filtering of noise is applied in the shadow regions. The circuit comprises a two-stage logarithmic (Log) amplifier having a total dynamic range (DRLog) equaling 100 dB (e.g. a minimum-to-maximum output ratio of 100,000). The Log amplifier is divided into two cascaded stages denoted LOG1 402 and LOG2 404. It is, however contemplated that separate signal processing amplifiers can be utilized. The output of the Log amplifier first stage 402 is connected to a variable low-pass filter. The filter 406 has an adjustable filtering range of 10:1. The operation of the filter is described further below. The filter 406 receives a control signal, representing a filter cut-off value from a control electronics block 408. The control electronics block comprises an amplifier that responds to the input image signal 405, and by adjusting the filter cut-off value based upon the prevailing characteristics (highlights or shadows) of the signal 405. The output of the filter 406 is connected to the Log amplifier second stage 404. The filtered output of the Log amplifier second stage 404 and the output of the Log amplifier first stage 402 are combined at a summing circuit 410 to produce an output Log analog image signal. Each Log amplifier stage 402 and 404 processes one-half (50 dB) of the total dynamic range of the input image signal 405. For a 1.0 Volt maximum signal level, the first stage 402 processes signals in the range of 0.00316 Volt to 1.0 Volt and the second stage 404 processes signals in the range of 0.00001 Volt to 0.00316 Volt. The first stage and second stage Log outputs are summed to provide the total 100 dB Log amplification range.

As discussed above, variable low-pass filter 406, connected between the two Log amplifier stages 402, 404, is regulated by the control electronics block 408 to vary the bandwidth of Log amplified low-level signals. The filter is adjustable over a 10:1 range, which corresponds to a reduction in electronic noise by 3.16 times. This reduction translates into an increase in the dynamic range of 10 dB. According to this embodiment, the amplifier function of the control electronics 408 adjusts the low-pass filter 406 so that the filter allows a maximum bandwidth to pass when the input signal is greater than 0.002 Volt. When the signal is less than 0.0003 Volt, the control electronics 408 adjusts the filter to allow the minimum bandwidth to pass. The bandwidth filtering response between these limits is adjusted by the control electronics based upon a monotonic response function. The values for maximum and minimum bandwidth can be established based upon a desired signal-to-noise ratio that is acceptable for shadow images. An acceptable level can be established based upon experimental data, varying the bandwidth level and observing the quality of the image or based upon previously established industry standards for image quality.

The signal output from the summing circuit 410 is a Log-amplified analog image signal 411 having a 100 dB range. For the signal to be translated into a storable data file, it is converted into a digital signal by a conventional analog-to-digital converter 412. The converter 412 can be part of the noise suppression circuit 400, or can be located at another point along the signal path.

It is common in certain fields, such as the medical arts, to store and display image data in logarithmic form. The contrasts between details are enhanced during display when image intensities are reproduced based upon a logarithmic translation. In one embodiment, an anti-log function is used to translate the logarithmic digital signal output from the converter 412 into a linear digital signal for file storage as a non-logarithmic image file. The anti-log function can be implemented as a discrete circuit or can reside as a software procedure within the CPU 52. The anti-log function, according to one embodiment can comprise a look-up table in which the logarithmic image data is compared to linear data values, and a translation of data is made based upon the compared values. Note that the anti-log function according to this embodiment occurs in the digital signal domain. It is contemplated that the anti-log function can be implemented in the analog domain, with the signal subsequently translated into a digital format. Note, as an alternative, scanning can be implemented fully in the linear signal mode, in which case an anti-log function is not employed and filtering occurs only in the linear domain.

While base-ten Log amplifiers are used to process the signal according to this embodiment, it is contemplated that other forms of signal amplification can be employed. Appropriate deamplification functions are used to return the signal to a storable linear format. Such signal processing devices, shall be termed signal "amplification circuits" herein.

Figure 21:
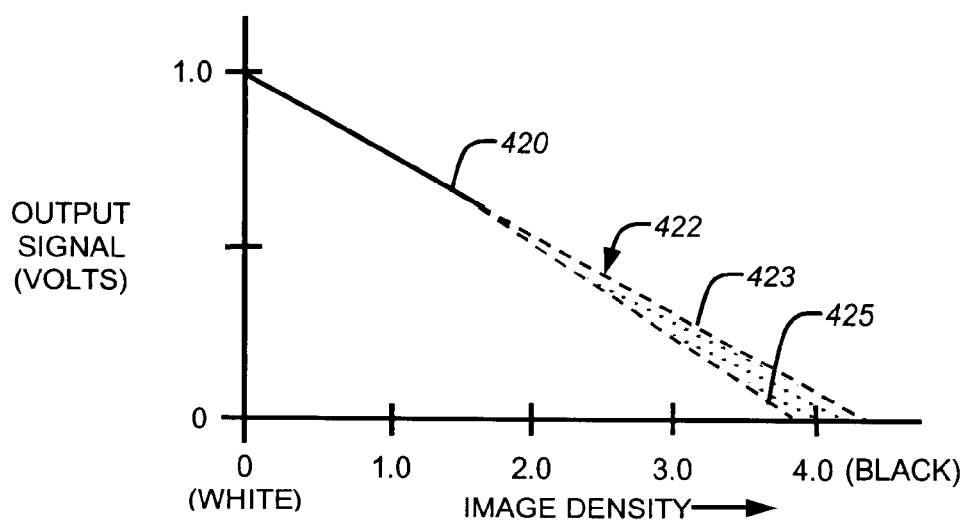
FIG. 21 is a graph showing reduced electronic noise at low-light response levels in the CCD camera circuit having noise reduction according to an embodiment of this invention.

FIG. 21 shows an exemplary response curve 420 for signal voltage versus image density obtained using the dynamic noise suppression processes described above. The curve 420 exhibits reduced noise characteristics (422) in the shadow regions. The band of deviation 423 is markedly narrower than the unfiltered band (393 in FIG. 19), and the signal, generally, deviates less from the expected linear response curve 395 (shown in phantom). As illustrated, noise associated with shadow details is effectively reduced without sacrificing needed bandwidth in the high-intensity regions of the image.

2. Pixel Intensity Averaging

The CCD element of this embodiment is arranged to provide a resolution of 584 pixels per inch (PPI) for a 14-inch wide image. Medical X-rays and other films often permit a lower resolution—on the order of 75–150 PPI. Using a higher-than-necessary resolution entails a waste of data storage space to store extra image data and slows the scanning and storage processes by causing the various system processors to operate on a larger volume of data. It can also make transmission of image data over telephone lines or other data transfer networks prohibitively time-consuming.

Figure 22:
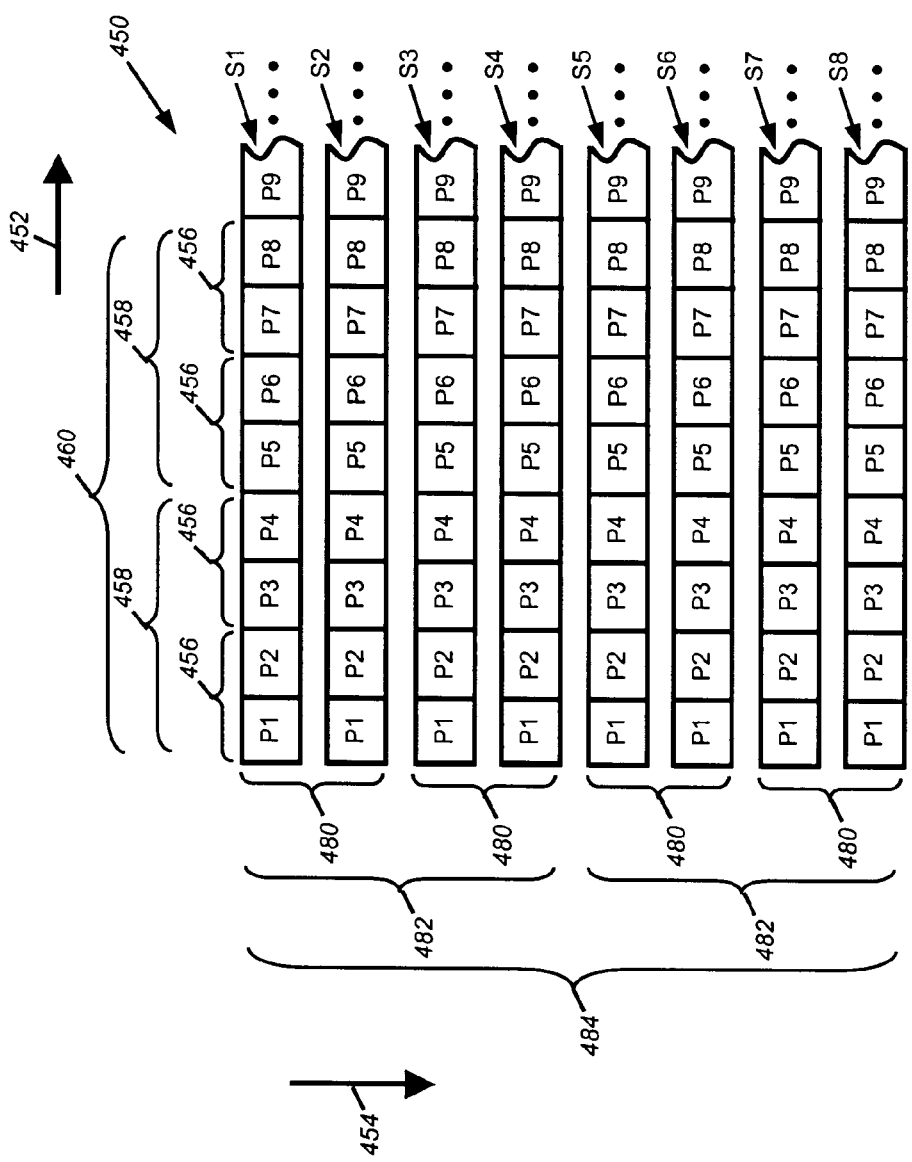
FIG. 22 is a schematic plan view of an array of pixels grouped for intensity-averaging according to an embodiment of this invention.

FIG. 22 schematically depicts a linear array 450 of picture elements (CCD "pixels") within the CCD element. The CCD pixels arranged in the direction of the scanner width, or "fast scan" direction (arrow 452), and are denoted P1, P2, P3, P4, P5, P6, P7, P8 and P9 according to this example. In all, approximately 8,000 CCD pixels are provided in the linear array 450 according to a preferred embodiment of this invention. While not shown, this full range of pixels can be denoted as P1–P8000 for the purposes of this discussion. As described previously, the pixels view discrete lines of the image spaced approximately one pixel width apart in the feeding or "slow scan" direction (arrow 454). In other words, every 8 milliseconds, the array locks in a line image. According to this embodiment, the motor 46 is instructed to move 152 steps/second to attain 584 PPI resolution. The movement of the sheet in the slow scan direction is sufficient to present the next pixel width (approximately 0.00171 inch of the full-size image) to the array. A series of adjacent scan lines along the length of the image are represented by contiguous rows of pixels P1–P9 denoted as S1, S2, S3, S4, S5, S6, S7 and S8. Each row is a representation of the scanning of a different, adjacent part of the image by the same set of pixel—separated by time and space.

A method for reducing the camera's rated resolution, and smoothing the response curve involves the summing of the intensities of adjacent pixels in both the fast scan and the slow scan direction, and deriving an average intensity value for the group. The space occupied by the pixels in the image data field is provided with this average value and the scanned image appears as a single large pixel occupying the space of the averaged pixels displaying the average intensity value. 146 PP1 resolution can be obtained by dividing the native resolution 584 PP1 by a predetermined divisor. In the fast scan direction, groupings 456 of two pixels P1 and P2, P3 and P4, P5 and P6, and P7 and P8 can be made. Similarly groupings 258 of four pixels P1–P4 and P5–P8. Additionally a large grouping 460 of eight pixels P1–P8 can be made. Groupings of adjacent pixels across the entire length of the array 450 are, thus made. Depending upon whether 2, 4 or 8 adjacent pixel intensities are averaged, the effective number of CCD pixels is reduced to approximately 4,000, 2,000 or 1,000, respectively.

Figure 23:
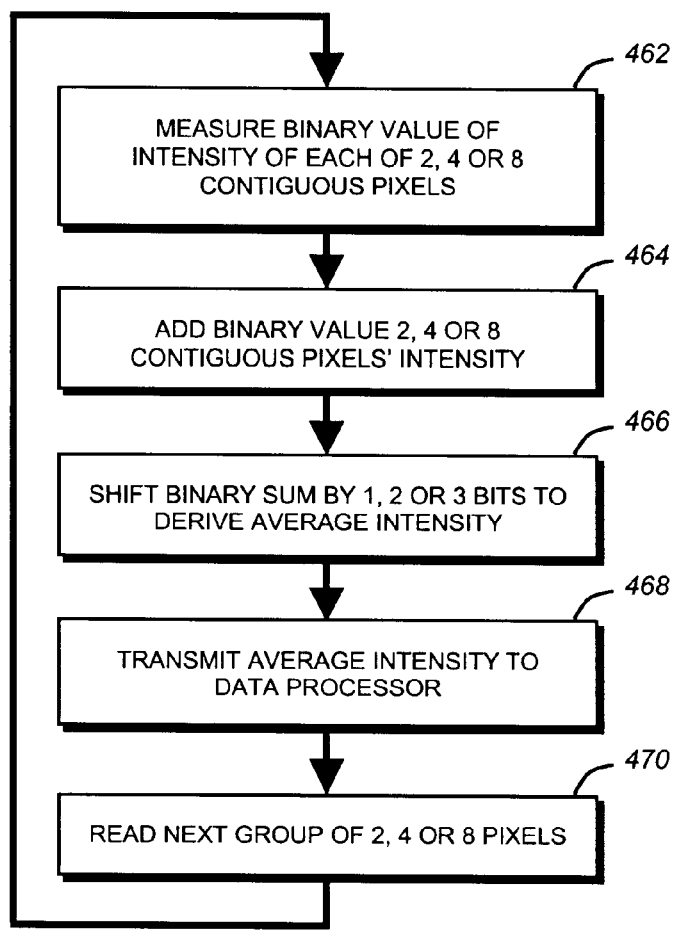
FIG. 23 is a flow diagram of a CCD pixel intensity-averaging procedure in the fast scan direction according to an embodiment of this invention.

FIG. 23 details a specific averaging procedure for adjacent pixels oriented in the fast scan direction. First, the binary value of the intensity derived from each of these pixels is measured in step 462 by the CPU or an associated averaging circuit. The CPU or circuit is provided with instructions to average either 2, 4 or 8 pixels depending upon the desired reduction in resolution. These binary intensity values are then added in step 464. Having a total binary intensity value for a group of 2, 4, or 8 continuous pixels, an average can be derived by shifting the binary sum by 1, 2 or 3 bits in step 466. Whether the sum is shifted by 1, 2 or 3 bits depends upon whether 2, 4 or 8 continuous pixels have been summed respectively. The average value is then transmitted downstream for further data processing and storage in the digital domain in step 468. Each adjacent group of 2, 4 or 8 continuous pixels is read in the fast scan direction in step 470. The averaging of adjacent array pixels continues for each scanned row (S1–S8, and so forth) until the entire image has been scanned in the slow scan direction.

With reference again to FIG. 22, the rows of slow scan pixels S1–S8 are also averaged. In other words, P1 can be intensity-averaged over a plurality of adjacent scan lines S1–S8. Likewise P2–P9 can each be intensity-averaged over a plurality of contiguous scan lines. The signals derived from adjacent scan lines can be grouped similarly to the grouping of adjacent array pixels for a single line as described above. For example, groupings 480 of two lines S1 and S2, S3 and S4, S5 and S6, and S6 and S7 can be made. Similarly groupings 482 of four lines S1–S4 and S5–S8 or groupings 484 of eight lines S1–S8 can be made.

Figure 24:
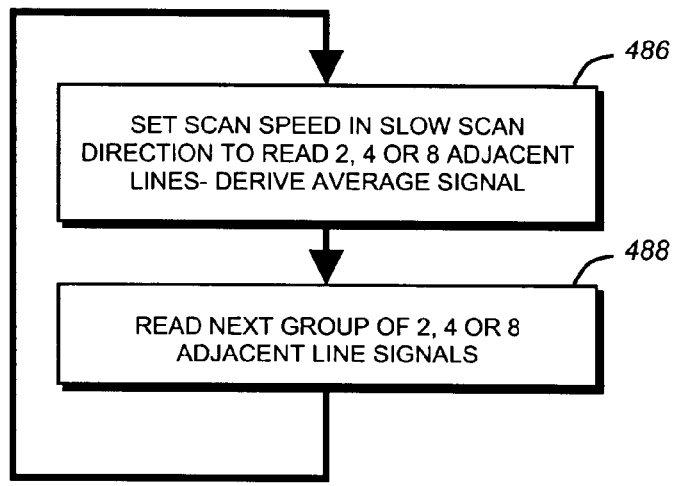
FIG. 24 is a flow diagram of a CCD pixel intensity-averaging procedure in the slow scan direction according to an embodiment of this invention.

FIG. 24 details a basic pixel intensity averaging procedure for line data in the slow scan direction The measured intensity of the output signal from a group of 2, 4 or 8 adjacent scan lines (the aggregate signal of all pixels in the array) is averaged in step 486. The averaging of lines is accomplished by increasing the scan speed so that the CCD views more than one line within the allotted line scan duration of 8 milliseconds. The line of CCD pixels essentially views a "blur" of several discrete intensities in the slow scan direction. The approximate average intensity of the passing group is transmitted by each CCD pixel. The speed of the drive motor 46 is increased 2, 4 or 8 times, to attain the desired average of 2, 4 or 8 lines, respectively. In step 488 the next group of 2, 4 or 8 contiguous lines is then scanned at the desired scan speed to derive an average slow scan intensity value. The process continues until the entire image has passed through the scanner.

Fast scan averaging and slow scan averaging are employed simultaneously. For example, two adjacent fast scan pixels P1 and P2 are averaged, and two lines S1 and S2 are scanned in one scan interval. The result is a grouping of four total image pixels into one larger square image pixel. The corresponding resolution is reduced four times, generating a desired 146 PPI image. Likewise, when four fast scan pixels are averaged, a group of four slow scan lines are scanned in one scan interval. The resulting averaged group of image pixels comprises a total of sixteen pixels in a square with a single averaged intensity. The corresponding area resolution is reduced sixteen times. However, it is accepted in the art to refer to resolution only in the linear, fast scan direction, even though resolution is typically reduced in both directions to maintain proper scale. Hence, by averaging eight pixels in each of the fast and slow scan directions, the resulting fast scan linear resolution is reduced from 584 PPI to 146 PPI. It is expressly contemplated that any number of pixels (e.g. 3, 5, 6 or 7) can be averaged in the fast scan and slow scan direction to generate images having other desired resolution. 2, 4 and 8 pixel averages are made in a preferred embodiment to enable binary division of the fast scan intensity value as described above. Averaging can occur in either order (e.g. fast scan first and slow scan second, or vice versa). Sums for pixel values in one direction are then averaged in the second direction to obtain the final average for the square in both orthogonal directions.

The averaging of adjacent fast scan pixels achieves an improvement in the signal-to-noise ratio of the CCD element that extends its dynamic range significantly and that produces a smoother-appearing image. Averaging two adjacent pixels decreases the effective electrical noise by $\sqrt{2}$ while extending the dynamic range by $\text{Log}(\sqrt{2})$, equal to 0.15 grayscale density. Taking the slow scan resolution reduction into account, the noise is in fact reduced by $\sqrt{4}$ or two times, while the extension of the dynamic range overall is doubled to 0.3.

IV. Image Size Determination

A. Size Measurement and Associated Scan Adjustment

If the size of a sheet is not accurately known by the scanner, the camera element may scan beyond the lead and trail edges and beyond the widthwise edges, producing image data for the open area around the sheet as well as the image. Since image data takes up substantial quantities of data storage space and processing time, it is desirable to omit as much external scan data as possible, particularly in the fast scan direction, where the widthwise edges may be much narrower than the field of view.

Described herein is a image size-measurement procedure particularly suitable for developed X-ray film such as the film sheet 60 shown in FIG. 2. The film sheet 60 includes a predictably sized, substantially rectilinear outer perimeter 74. At least part of the background 68 adjacent the perimeter 74 exhibits a substantially dark shade providing a significant contrast with the unattenuated free space outwardly of the perimeter. In any case, the base film exhibits an increased density relative to the surrounding, unattenuated free space.

Figure 25:
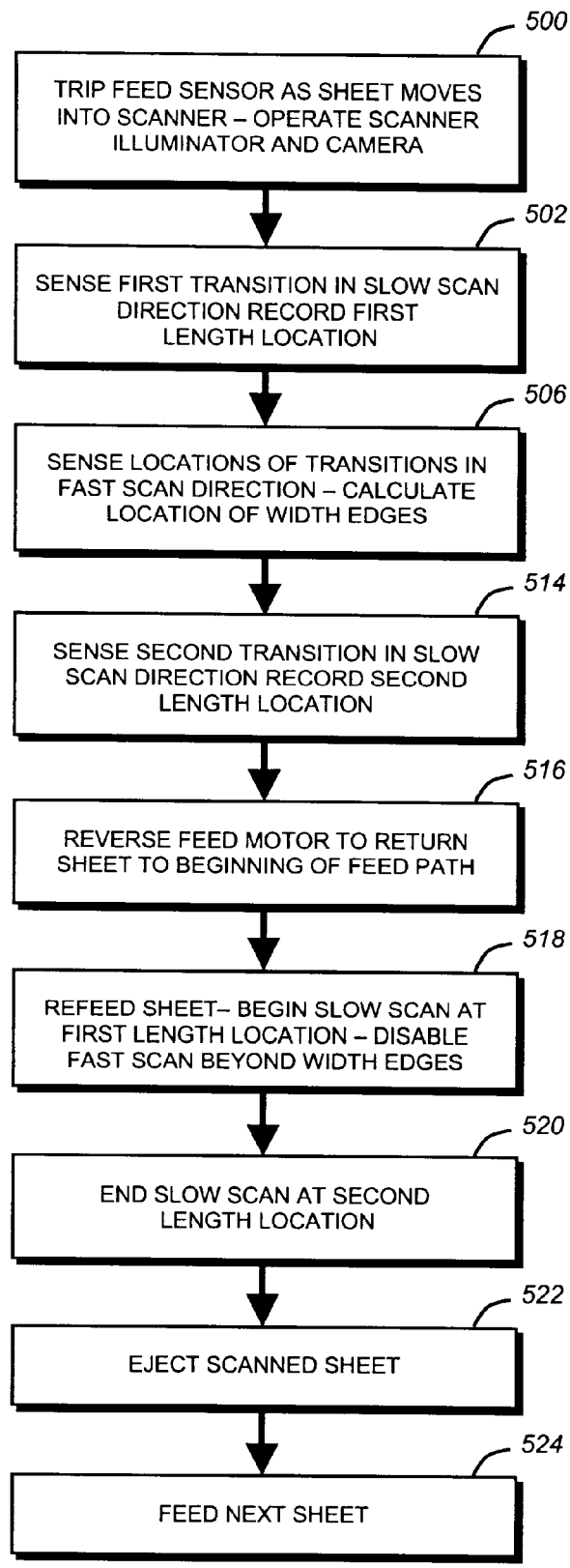
FIG. 25 is a flow diagram of an automatic image size sensing procedure according to an embodiment of this invention.

According to the procedure detailed in FIG. 25, the sheet 60 is input to the feed rollers pairs 38 and 40. As the lead edge 501 of the sheet 60 passes into the rollers, the CPU 52 activates the scanner's illuminator and CCD camera in step 500. The scanner CPU does not create an image data file for storage by the microcomputer 107 at this time. Rather the CPU polls the CCD for the output signal in the fast scan direction continuously until the output changes from the white shade exhibited by the unblocked illumination light to shadows of the background in step 502. Since the sheet's width is not yet known, the procedure polls for an intensity transition small segment of the lead edge located, for example, in the relative center of the field of view. This indicates the location of the lead edge 501. Since the sheet edges may be skewed slightly, the procedure can be instructed to poll for the light/dark margin transition line over a few slow scan lines. If the transition occurs within a predetermined number of lines, then the top margin is confirmed. The location of the lead edge is compared to the relative position of the motor 46. If a stepper motor is used, the "steps" can be counted. Other types of drive motor can be provided with an encoder or other data acquisition device for measuring rotation that is interconnected with the CPU. The CPU, thus, monitors the motion of the motor 46 as it feeds the sheet 60 into the scanner. The relative position of the motor in the slow scan direction is, hence, stored by the CPU as indicating of the location of the lead edge 501 (FIG. 2).

In step 506, the CPU then polls the entire fast scan direction for the transition between the side edges 510 and side background lines 512 (FIG. 2). The location of the side margin lines is derived based upon the location in the CCD pixels at the boundaries between a maximum highlight and a darker attenuated light. The location of the widthwise boundaries can be scanned continuously as the sheet progresses through the scanner, mapping the boundary locations to the location of the motor 46. Alternatively, the CPU can poll the widthwise boundary at one or more specific slow scan location(s) and establish a scan width for the entire image based upon the measured value(s).

In step 514, the CPU continues to poll for a transition at the trail edge 515. Again, the entire fast scan direction can be scanned, or the scan for the trail edge transition can be limited to a particular widthwise segment that is less than the total fast scan field of view. The location of the trail edge 515 is located, and before the sheet 60 is ejected by the downstream feed rollers 40, the motor is reversed in step 516. The trail edge sensor can be used to signal the CPU as to the relative location of the trail edge, so that the sheet is reversed before the trail edge exits the rollers 40. The sheet is driven in reverse, first by the rollers 40 and, thence by the rollers 38, to a start position in which the lead edge 504 is again upstream of the camera's field of view. The CPU now has a data file mapping the locations of the sheet edges versus the relative rotational position of the motor (based upon the motor's step locations).

Knowing the relative rotational position of the motor at the end of the first scan cycle, the CPU restarts the feeding process in step 518. The sheet is scanned with the camera started at the known location of the lead edge. Image data is acquired and transmitted by the camera based upon the recorded widthwise margins, data scanned outside of the edges is neither stored nor transmitted to the microcomputer 107, saving data processing time. When the known length has passed through the field of view of the camera, the camera is deactivated in step 520. The sheet 60 is then ejected by the rollers from the scanner in step 522. The next sheet is fed into the scanner in step 524 and the procedure above is repeated.

The CPU can be provided with the approximate expected size for the scanned images as a default value. In the case of developed X-ray film, the sizes tend to be standardized, and a data input key indicating relative sheet size can be provided to the scanner according to an embodiment of this invention.

As noted above, the size measurement procedure described above is applicable to a sheet having a minimal intensity transition at its edges. A sheet having highlights at its edges will still attenuate light intensity to a small extent. The transition to the lower intensity value can be used to establish the edges of the sheet.

B. Illumination Field Size Adjustment

Figure 26:
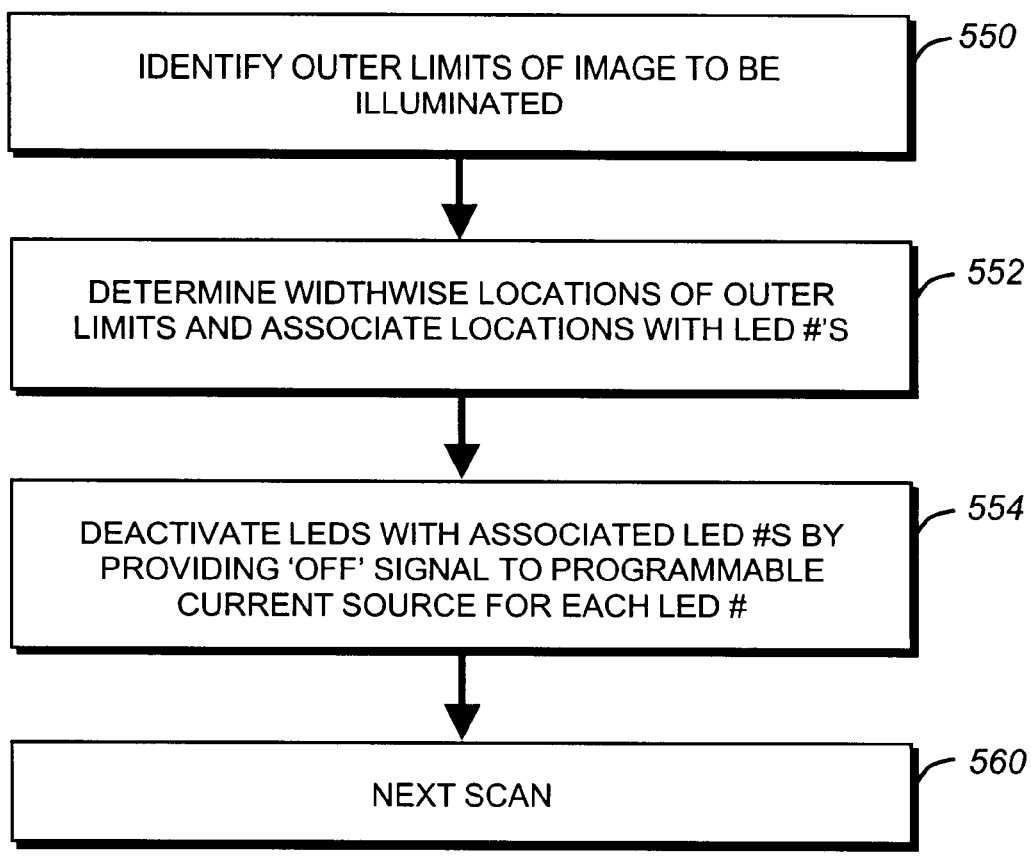
FIG. 26 is a flow diagram of an illumination assembly width control procedure according to an embodiment of this invention.

The techniques described above for controlling the scan size also enable selective control of the field of the illumination assembly according to an embodiment of this invention. An advantage to providing an illuminator comprised of a plurality of discrete light sources is that the light sources can be selectively deactivated where light is unneeded. It is desirable to attenuate unneeded light outside of the image field, since this light can fall into the camera assembly as stray light which can degrade the photometric accuracy of the image. By locating the widthwise limits of the image, LEDs that project light beyond the limits are deactivated by the CPU. FIG. 26 shows a flow diagram for an illumination control procedure according to this embodiment. First, the CPU identifies the widthwise (fast scan) edges or other limits of the image 550. This can be accomplished using the automatic size sensing procedures described above, by use of movable edge guides (not shown) on the stack tray having width sensors that signal the CPU or by manually entering the width of the document into the CPU through the microcomputer's user interface or another data entry device interconnected with the CPU. In a preferred embodiment, it is contemplated that a document is fed through the scanner in a centered orientation relative to the width. Thus, a sheet or image that is narrower than the maximum width will have an equal width of free space outward of each widthwise edge.

After identifying the widthwise limits of the image in step 550, the CPU associates the locations of the widthwise limits of the image with the physical locations of particular LEDs in step 552. In other words, LEDs that are located outwardly of the limits of the image are identified, based upon their known locations within the array, and the LED# of each identified LED (e.g. LED1, LED2 . . . and . . . LED58, LED59 and LED60) is stored in a file that denotes unneeded LEDs in the array for the particular scanning operation currently underway. The LEDs can be associated with the widthwise edges in a variety of ways. The size of the sheet can be provided to a size equation or look-up table that correlates particular LEDs in the array with a given size value. As size increases, the number of unneeded LEDs on each edge is reduced. Alternately, the CCD camera element can be used to directly determine which LEDs are registering a free space intensity. Since LEDs are mapped to CCD pixels during the calibration process, the LEDs can be readily identified by which CCD pixels are registering full intensity.

In step 554 the LEDs are deactivated by transmitting a signal representative of a minimum driving current or no current the each identified LEDs' programmable current source via the data line 162 (FIG. 7). Other LEDs in the array are driven at their standard driving current based upon each LEDs' respective calibration value. It is contemplated that one or more LEDs that are adjacent, but outward of, to the limits of the image can be driven. This can ensure that the edges are fully illuminated since some cross talk between LED light patterns is known to exist.

Once the scan using the reduced-width LED array is completed, the procedure returns to begin the next scan in step 556. The LED array can operate using the same adjusted width if the CPU is instructed to do so, or a new set of width parameters can be selected. The procedure is then repeated using the new width parameters.

As described below, it is contemplated that portions of the image within the overall boundaries of the sheet or image can be scanned individually. Such "regions of interest" can have widths that are less than the overall width of the image. By specifying the width using, for example, the procedures described below, the LED array can be adjusted to deactivate LEDs falling outside of the width of the region of interest. Note that the region of interest need not be centered with respect to the overall image. By providing appropriate coordinates referenced, for example, to the scanner centerline or a widthwise edge, the corresponding unneeded LEDs can be identified. Likewise it is contemplated that two or more separate LED array widths can be used in a single image. The location along the length of the document is tracked, using the drive motor as a reference, and the width is changes as predetermined lengthwise locations are reached.

It is further contemplated that sheets can be fed registered to an edge of the tray rather than the centerline. Appropriate edge guides (not shown) can be provided to facilitate side registration. In such an arrangement, the LEDs on a single side are is generally deactivated based upon known image size and/or edge location data.

V. High-Resolution Overlays

As discussed generally above with reference to pixel averaging procedures, it is often desirable to reduce the resolution of the scanned image to generate a smaller image data file and speed the scanning process. The current standard for resolution radiological scanning is approximately 73–146 PPI, which enables an image to be viewed on a monitor having between 1–2K of horizontal pixels. Reduction of the scanned resolution from the higher native resolution of the CCD element to this standard is employed according to an embodiment of this invention. This lower resolution is also advantageous when transmitting images over a computer network or facsimile machines serviced by voice-carrying telephone lines since the data transmission speed of theses carriers is often highly limited.

A higher resolution image of a particular region of interest on an overall image is sometimes required for specific diagnostic purposes. For example, an image of a broken bone may reveal a complicated fracture pattern requiring closer study. A low-resolution image may be insufficient to accentuate important details of the fracture. However, scanning an entire image at high-resolution simply to capture a relatively small region of interest wastes significant data storage and scanning/processing time.

In general, medical images can be formatted according to the well-known DICOM-3 standard, promulgated by the American National Standards Institute (ANSI). The DICOM-3 standard defines a data structure that enables related images to be grouped together to form an image "series." As described above, diagnostic X-rays are usually taken as a series, such as left, right, top and bottom views of an injured area. Views of the same area at different times can also comprise a series, as can any other associated group of images. Using the functionality of the DICOM-3 standard, it is possible to generate associations between a parent image and a higher-resolution region of interest, "child" image.

Figure 27:
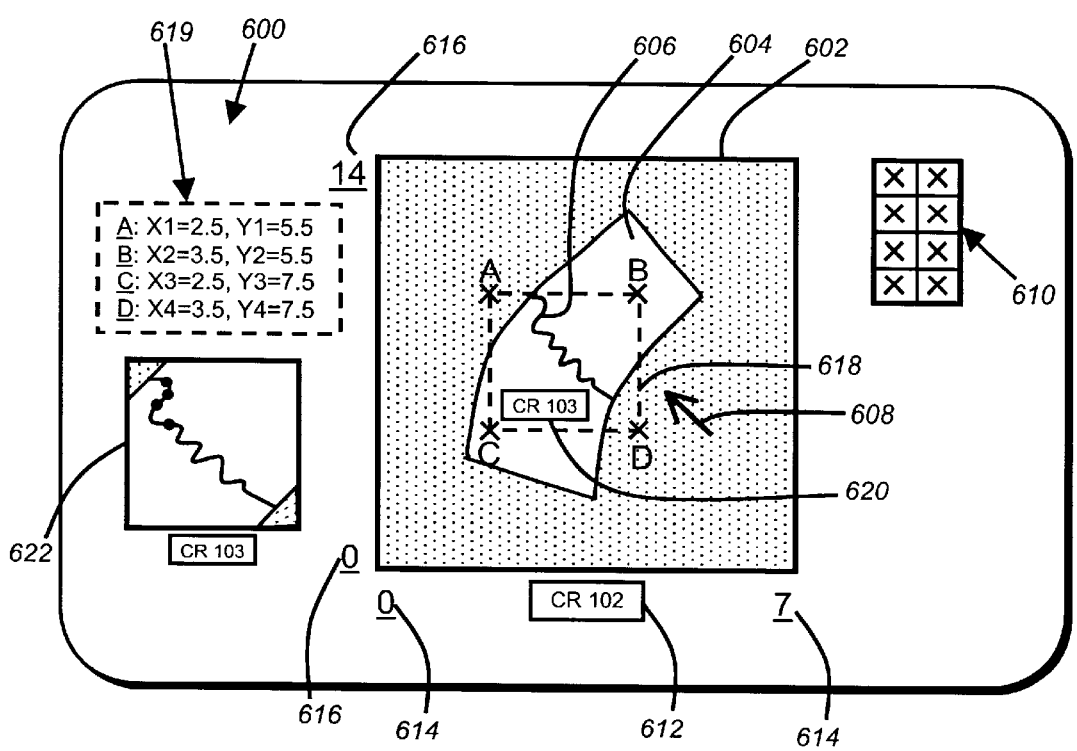
FIG. 27 is an exemplary developed low-resolution X-ray film image referencing an associated high-resolution detailed image according to an embodiment of this invention.
Figure 28:
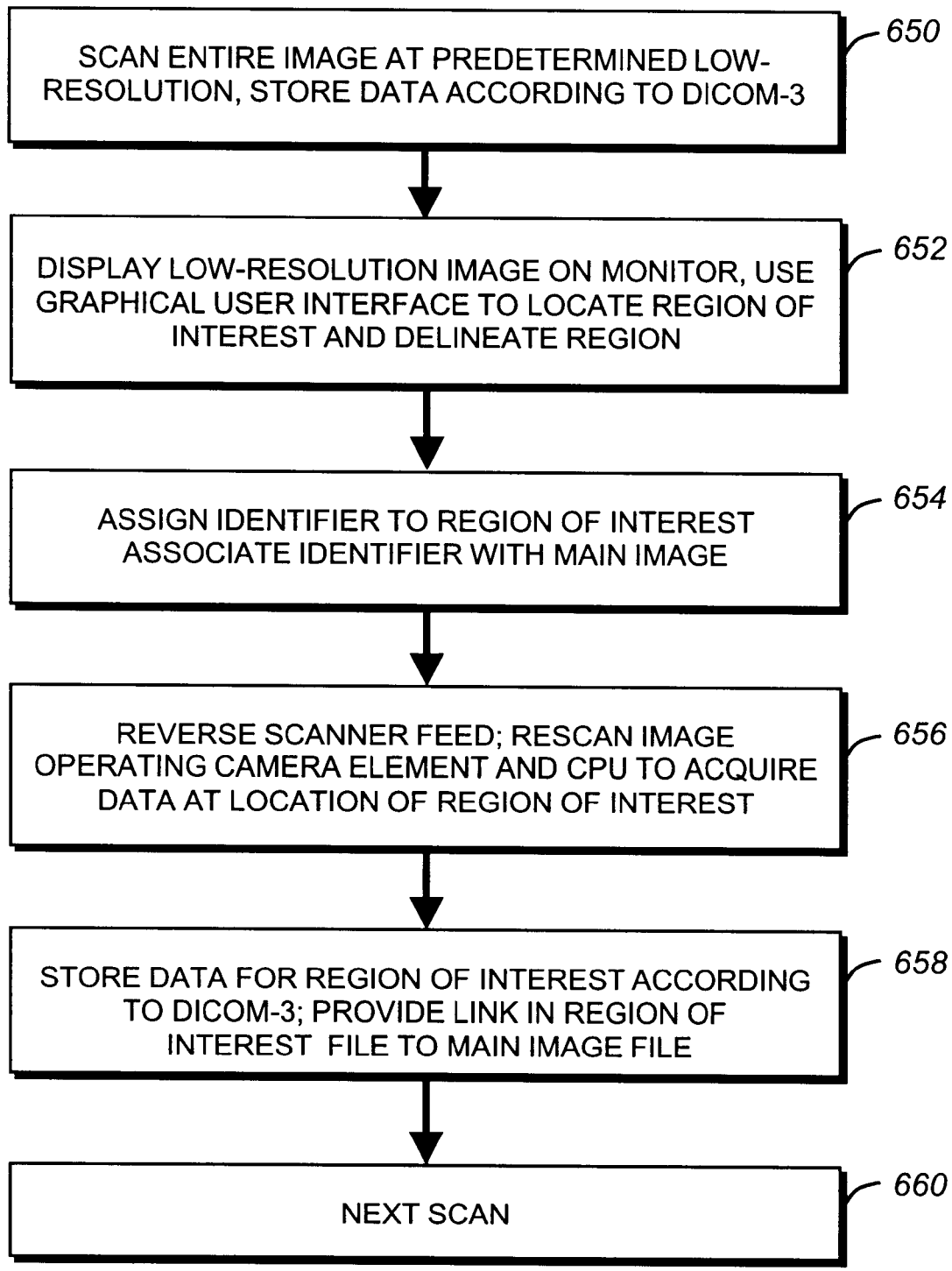
FIG. 28 is a flow diagram of a procedure for generating a high-resolution detailed image and associating the image with a portion of a low-resolution overall image as shown in FIG. 27.

FIGS. 26 and 27 respectively illustrate a display and procedure for generating an associated high-resolution child image of a region of interest in the lower resolution parent image. The monitor screen 600 projects a low-resolution (approximately 146 PPI) image 602 having been recently scanned from a developed X-ray film sheet (not shown). The main subject 604 of the image 602 contains a region of interest 606 that is much smaller than the subject 604 and overall image 602. The screen in this embodiment is set up in a Microsoft Windows®-style graphical user interface format. The user interface is controlled based upon the microcomputer keyboard 111 and mouse 113 (FIG. 1) that enable entry and manipulation of text data and control of a screen cursor 608. A button bar 610, manipulated by the cursor 608, is provided to act upon screen data and enter instructions. General control of the scanning process can be undertaken using the button bar 610 and associated data entry devices.

The parent image is provided with a file identifier 612, that is printed adjacent the image 602 in this embodiment. The identifier 612 can also be positioned within the background or margin of the projected image or at another acceptable location. The image can include various size notations 614 and 616 in the respective horizontal (widthwise) and vertical (lengthwise) directions. Other notations can also be provided as appropriate to assist the reader in understanding the nature and content of the image, such as information related to patient name, time, date, location, series, diagnosis and miscellaneous notes.

The main subject 604 of the image 602 contains a region of interest 606 delineated by a dashed-line border 618. The border can be visible on the screen or can be represented by its corners A, B, C and D. The shape of the border can be varied depending upon the geometry of the region of interest. The border 618 is defined by movement of the cursor in conjunction with commands entered via the button bar 610 or keyboard (or both). Information regarding border coordinates is shown, in this embodiment in a window 619. A variety of conventional applications are available for defining borders on screen images. A separate identifier 620 is printed within the border. Like the parent image identifier 612, the region of interest identifier 620 can be located at any acceptable location that is understandable and readable. The identifier 620, in substance, provides an annotation to an associated file that contains a higher resolution rendering of the delineated region of interest. That rendering is shown on the screen 600 as a window 622. The window 622 contains an identifier 624 that corresponds to the region of interest identifier 622 annotating the parent image 602, the nature of the identifiers is based upon user preference. Related identifiers can be designated as different series numbers or as sub-files to specific images in a series.

The particular screen representation and information shown in FIG. 26 is only one possible display format. The DICOM-3 standard relates to a format for storing data that enables linking of image files to create "overlays" wherein one image file includes an annotation that links that file to another file. As described herein, the overlay is an identifier for a separate high-resolution child image of a portion of the parent image. The DICOM-3 standard makes possible the illustrated display of files, and a variety of other organizational structures known to those of ordinary skill. For example, files can be transmitted via DICOM-3 over a telecommunications link. The advantage to the linking procedures as described herein is that a user has instant access to associated data in linked files, and these files will not become lost or inadvertently separated. Using the above-described format, minimum storage and communications resources are employed since high resolution data is used only where needed. Note that several regions of interest can be linked to a single file according to this invention. Each would utilize its own annotation on the parent image.

A basic procedure for establishing a high-resolution overlay is now provided, with reference to the flow diagram in FIG. 27. Initially, a film is scanned and the microcomputer and CPU are instructed to format image data according to the DICOM-3 standard in step 650. The entire image is stored in low-resolution format using the procedures described above. The CPU tracks the movement of the drive motor to monitor the relative locations of portions of the scanned image in one embodiment.

The low-resolution image is displayed on the monitor screen once scanning has been completed in step 652. An operator can identify a region of interest on the low-resolution monitor display. Using the mouse to manipulate the cursor, and the button is bars, the user can delineate borders for the region of interest. The borders are internally processed by the microcomputer and the CPU to determine the scanning location on the film of the region of interest. This location will be used to perform a rescanning of the region of interest as described further below. Before rescanning, the user or the computer assigns an annotating identifier to the region of interest in step 654. This identifier is appended to the parent image file according to the DICOM-3 standard, and appears as an overlay annotation on the parent image.

The scanner can either eject the scanned film, or reverse it to its original starting position within the scanner in a manner similar to the size-sensing embodiment described above. In step 656 the film is then rescanned while the CPU polls for the region of interest. The CPU uses the position of the motor to find the slow-scan location of the image and uses fast-scan location data derived from the original low-resolution image to perform a high-resolution scan and storage of data in the region of interest. Other image data, outside the region of interest is not stored. The mechanics of the high-resolution scan are similar to those described with respect to the size sensing embodiment described above.

In step 658 the high-resolution data is stored in a file according to the DICOM-3 format and is identified by a link that corresponds to the annotation on the parent image. In further transmissions or data transfers, the resulting parent and child files are provided as a unit unless otherwise instructed. The annotation of the parent image with the identifier can include the provision of hypertext command structures according to known techniques. According to such a command structure, when a user manipulates the identifier with the cursor, it causes the child image to appear in a separate window or a new screen view. Finally, in step 660, the next image is scanned by an operator.

It is contemplated that several high-resolution scans can occur in a single rescanning pass. Each region of interest is located on the parent image as it is rescanned based upon the procedures described immediately above. It is further contemplated that a plurality of rescanning passes can be made to add further regions of interest to the parent image file. Alternatively, if the location of the region of interest is accurately known, the CPU can be instructed to perform a high resolution scan of the known area based upon previously entered film sheet coordinates. Accurate registration of the sheet is desirable. Registration can be determined by carefully feeding the sheet, or by performing a prior size-sensing scan as described above.

VII. Camera Assembly Bias Calibration

As discussed above, the individual pixels of the CCD camera element each output individual intensity value signals that may vary significantly from pixel-to-pixel, even in the presence of a substantially constant incident light intensity. This variability generally results from slight manufacturing differences between pixels in the CCD array and nonuniformity in the illumination assembly. The differences between output signals are minimized, in part, by providing appropriate correction factors to each CCD pixel's output signal. In particular, each CCD pixel may provide a different output signal (dark current) for the same shadow/dark-viewed intensity. Additionally, each CCD pixel may exhibit a different gain in response to illumination. Gain can be determined by comparing the dark calibration and light calibration output signal value for a pixel. Light and dark calibration of the CCD camera element are described generally above with reference to FIG. 8.

According to a preferred embodiment it is contemplated that the gain of all CCD pixels is initially adjusted as a group during the illumination calibration step. The bias adjustment procedure (now to be described) is then initiated. Following the bias adjustment, a fine-tuning of the gain of each individual CCD pixel can also be performed. The initial and fine-adjustment of gain can be conventional and, therefore, is not described in detail.

Figure 29:
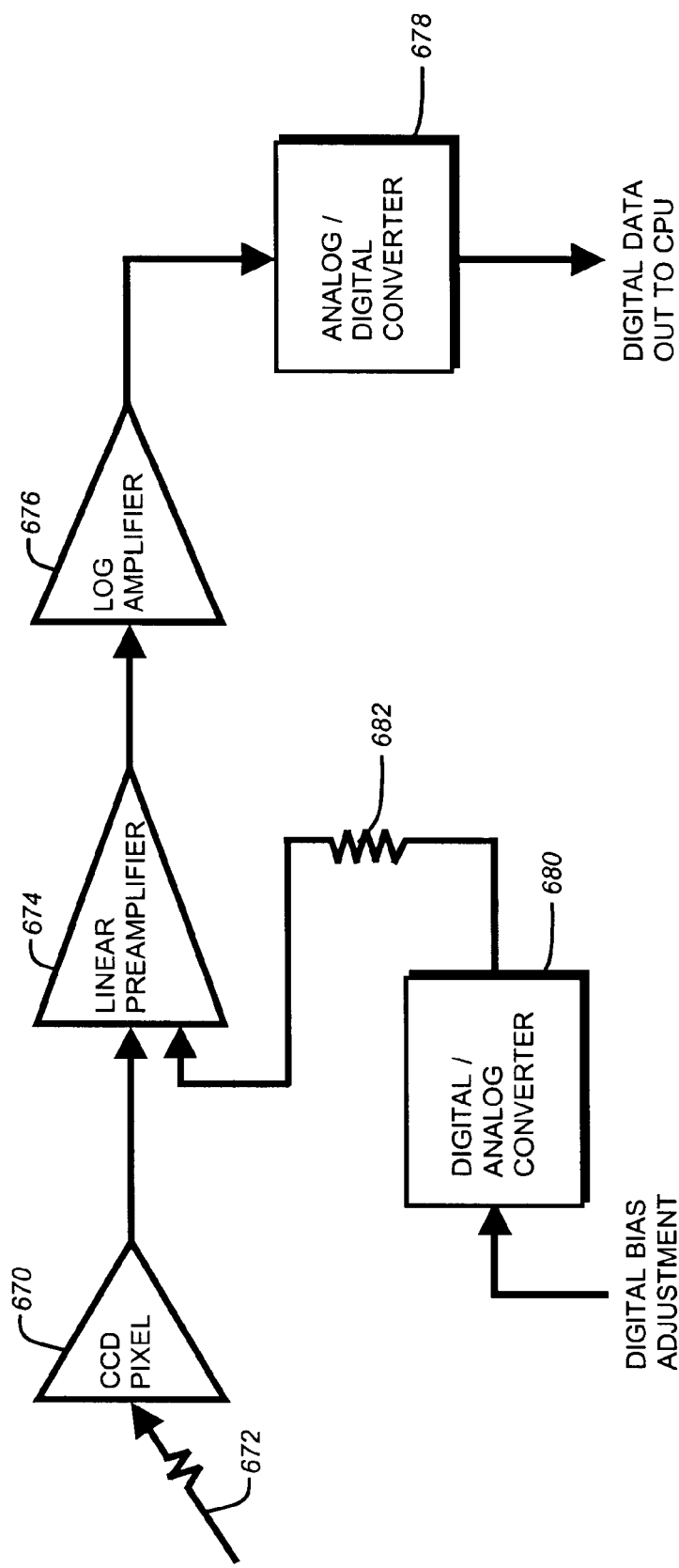
FIG. 29 is a block diagram of the output stage of a pixel in the CCD array according to an embodiment of this invention, detailing the preamplification, amplification, analog/digital conversion and bias adjustment stages.

FIG. 29 details the output stage of a typical CCD pixel of the CCD camera array according to a preferred embodiment of this invention. The CCD pixel 670 converts incident light 672 into an output linear analog intensity signal that, as described above, is sampled every 8 milliseconds. The linear output signal can be characterized as either a variable voltage or a variable current signal based upon Ohm's Law. For the purposes of this discussion, both a voltage and a current characterization are used. The linear output signal is transmitted to a linear preamplifier 674 that increases the range of the linear intensity signal to a desired scale, such as 1 volt. The amplified linear signal is transmitted from the linear amplifier into a base-10 logarithmic amplifier 676. The logarithmic amplifier 676 can comprise the two-stage log amplifier detailed in FIG. 20 with reference to dynamic noise suppression. It is contemplated that the analog image signal of FIG. 20 can be the signal output from the linear preamplifier 674, and that the logarithmic amplifier 676 can, in fact, include all amplification and filtering elements for providing dynamic noise suppression according to FIG. 20. The logarithmic amplifier stage outputs a logarithmically expanded analog signal that is transmitted to an analog/digital converter 678. The analog/digital converter in this embodiment generates a corresponding 12-bit digital numerical intensity value in the logarithmic domain for the corresponding input logarithmic analog signal. This digital signal is passed to the CPU as system response data.

A digital/analog converter 680 transmits, via a matching resistor 682, a bias current to the linear preamplifier 674 that produces a summed current input to the logarthimic amplifier. The CPU provides numerical digital bias values that are converted into corresponding analog voltage/current values by the digital/analog converter 680. The bias voltage/current is summed at the linear preamplifier 674 to generate an output signal that comprises a bias-adjusted, amplified linear signal. This bias-adjusted, amplified signal is input to the logarithmic amplifier 676, and finally output in logarithmic-digital form to the CPU. In subsequent scan operations, the output of each CCD pixel is continuously summed with an assigned bias-adjustment factor, and this bias-adjusted intensity value is stored as image data.

Figure 30:
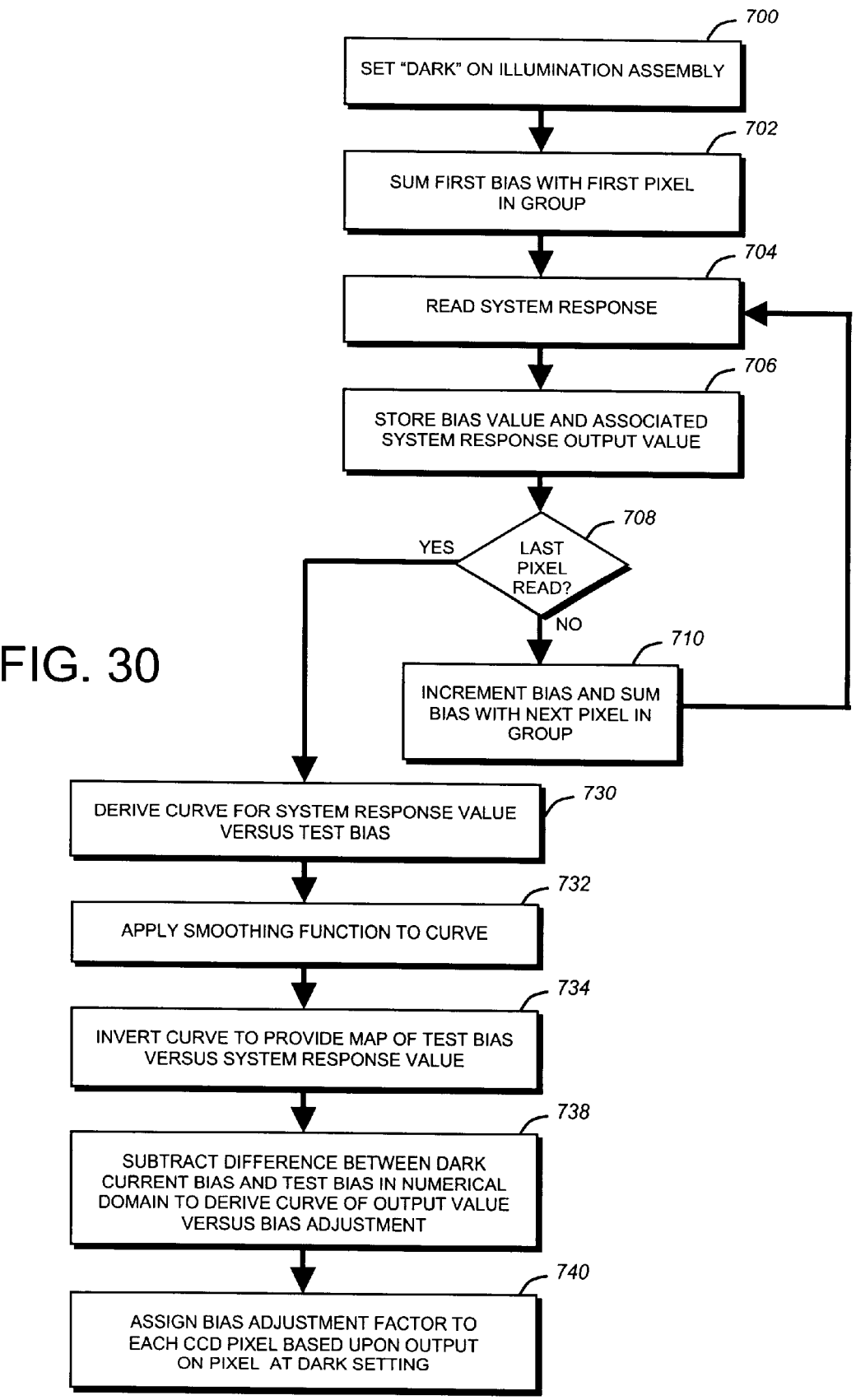
FIG. 30 is a flow diagram of a procedure for calibrating bias of each pixel in the CCD array having an output stage arranged according to FIG. 29.
Figure 32:
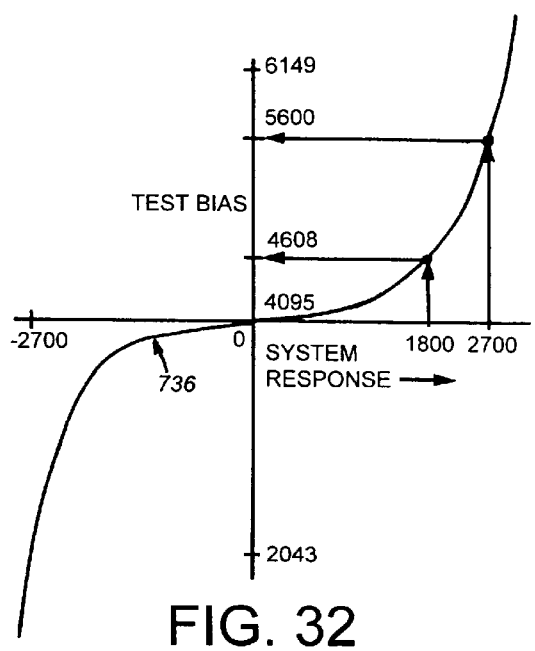
Figure 33:
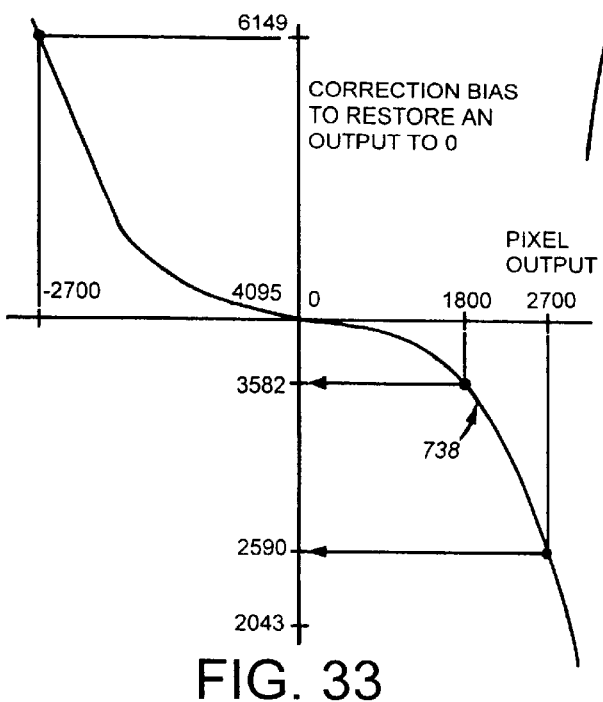

A procedure for calibrating the CCD array to adjust the bias of each pixel is detailed in FIG. 30. To exemplify the bias adjustment procedure reference is also made to a series of graphs shown, respectively, in FIGS. 31, 32 and 33.

The bias adjustment procedure begins in step 700 in which the illumination assembly is deactivated so that a maximum dark intensity is presented to the CCD array. A group of contiguous pixels within the CCD array is preselected to provide test values. Adjustment of bias for each pixel in the overall CCD array is subsequently based upon factors initially derived from this group. According to one embodiment, a group of approximately 4,000 pixels is selected. This is approximately one half the total number of pixels in the CCD array.

The pixels of commercially available CCD arrays exhibit a relatively uniform pixel-to-pixel output. A minimum number of pixels may exibit an output variation, typically in the range of one decade in the logarithmic domain. It is acceptable to establish a bias response curve based upon a relatively large group of CCD pixels since only a small number of pixels will vary significantly from a desired norm. The small number that show marked variablity are easily smoothed over using statistical smoothing and averaging techniques. The uniformity of dark current output across the array, in fact makes possible the efficient bias adjustment procedure that is now being described.

The output of the first pixel in the group is summed with a first bias value at the linear preamplifier stage at step 702. In this embodiment, the 12-bit digital numerical value for each bias is in the range of 2,043–6,149, which is chosen arbitrarily in this embodiment. This represents 4,096 different bias states centered relative to 4,095. The first bias generates an associated negative voltage/current that produces a negative system response data point 721 (see curve 720 in FIG. 31) from the logarithmic amplifier 676. The logarithmic amplifier 676 is precalibrated so that the bias voltage/current corresponding to the test bias 2,043 produces a negative system response at the output of the logarithmic amplifier. The analog/digital converter 678 at the output of the logarithmic amplifier generates an associated system response digital value shown as –2,700. Note that the negative system response is a convention used to effect calibration as described below, since the laws of mathematics do not permit negative logarithms in a literal sense. The logarithmic output scale on both sides of the zero-system response point 723 (FIG. 31) is intended to be represented by the response curve 720. The first digital system response value (–2,700) is read in step 704 by the CPU, and stored in the CPU memory with the corresponding test bias 2,043 as a data point in step 706.

The procedure queries, in decision step 708, whether a last pixel has been read. Since the first pixel is not the last to be read, the step 708 branches to the bias incrementing step 710. The digital/analog converter 680 is set up to provide a range of incremental current/voltage bias inputs to the logarithmic amplifier 674 that are summed with the associated dark current output for the linear preamplifier 674. As described generally above, the linear output of each pixel in the group is summed (at the preamplifier stage) with a different, upwardly ramped bias value to generate an overall system response versus bias curve 720 as defined in FIG. 31 in step 710. Each new system response is read in step 704, and stored as a digital, numerical value in step 706.

The procedure continues to upwardly increment the bias values, summing an associated current/voltage increment to the linear output of each new pixel until the last pixel output in the group has been summed with the last bias value. The corresponding voltage/current values pass from negative to positive at digital bias value 4,095 (in the iluustrated example). A system response of approximately 0 occurs at the cross-over point. The system response from bias values 4,096 to 6,149 produces associated positive voltage/current increments at the logarithmic amplifier 676. The calibration of the logarithmic amplifier produces a corresponding positive curve segment 724 with a logarithmic response scale equal to the negative segment 722. For a test bias having a digital value of 6,149, the digital system response is +2,700. This range of system responses output from the logarithmic amplifier (–2,700 to +2,700) represents the probable range of outputs transmitted from the logarithmic amplifier 676 when a given group of CCD pixels are each exposed to the same dark intensity. Note that by assigning a different ramped bias to each pixel, rather than assigning the ramped values to the same pixel(s), the entire response curve can be derived in a single 8-millisecond scan cycle.

Figure 31:
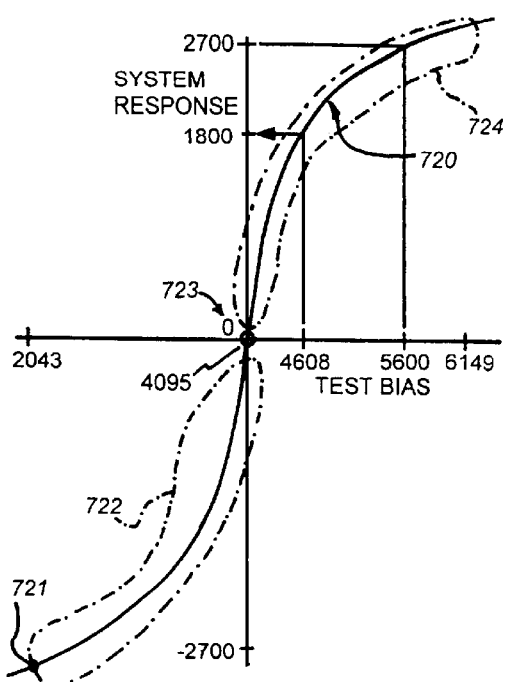
FIGS. 31–33 are graphs of curves derived according to the procedure of FIG. 30 for providing bias adjustment factors to each pixel of the CCD array.

When all pixels in the group have had bias applied, and have had the applied bias read as an output system response, the decision step 708 then branches to the curve-derivation step 730. The curve 720 of FIG. 31 is representative of a map of system response versus test bias in the digital (numerical) domain. In deriving the curve, the number of data points in the map can be reduced from the approximately 4,000 originally collected. For example, every eight contiguous data points can be averaged to derive a resultant mean value for test bias and a mean bias for system response. In one embodiment, every eight data points are averaged. Other conventional smoothing functions, such as least-squares can be applied to the curve 720 in step 732. Curve-smoothing is generally desired since each pixel will generate a slightly different system output to a given dark intensity that will cause noise in the resulting system response curve. In addition, certain pixels may exhibit significant variability, which statistical smoothing helps to eliminate. With appropriate statistical averaging, however, the overall output response of the pixels over given a range of bias values should define a substantially continuous curve.

In step 734, the curve 720 (FIG. 31) is inverted, by translating the data points to produce a curve 736 (FIG. 32) of test bias versus system response. By way of example, the curve 720 shows that a digital numerical response of 2,700 is obtained from a 5,600 digital numerical bias. Likewise a response of 1,800 is obtained from a 4,608 bias. The data points for a given system response are generated using associated test biases as detailed in FIG. 31. In other words, it can be determined that a system response of 2,700 corresponds to a test bias of 5,600, and that a system response of 1,800 corresponds to a bias of 4,608.

Based upon the data points of the inverted curve 736 (FIG. 32), a final table of adjustment factors is derived in step 738. This table is represented by the curve 738 in FIG. 33. Each system response has associated therewith a test bias as illustrated by the curve 736. In step 738, the procedure determines what adjustment bias in the linear domain must be applied to bring the output of a pixel to an approximate digital numerical value of 0 (or any other desired dark current response) when the actual digital output of the pixel in the logarithmic domain deviates from the desired 0 response. For example, a bias of 5,600 is 1,505 counts higher than the bias that produces a 0 response. In this example the bias that produces a 0 response is 4095. Note that a bias of 5,600 is associated with a system response of 2,700. The difference between the test bias of 5,600 and the dark current value of 4,095 is 1,505. This difference is calculated for each desired data point. The resulting difference 1,505 is then subtracted from the dark current value of 4,095 to obtain an adjustment factor of 2,590. The adjustment factor is then mapped to the associated system response of 2,700. Hence, if a pixel has an output of 2,700, the associated bias adjustment factor 2,590 will restore it to a system response of 0. Likewise, an output of 1,800 requires an adjustment bias of 3,582 to obtain a 0 response value from the logarithmic amplifier 676. Similarly, a logarithmic output of −2,700 corresponds to a bias adjustment of 6,149 at the linear stage to raise the dark current output of a CCD pixel in the logarithmic domain to 0. Of course, if the pixel provides an unadjusted logarithmic domain system response of 0, then a bias of 4095 is summed with the output at the linear output stage.

As described above, to speed the bias calibration process the curve 730 can be formed using data points that are spaced-apart by increments greater than 1. For example, incremental CCD pixel output values separated by 8 points can be stored in a map with their associated correction factors. This reduces the size of the file, speeding calibration. Adjustment factors for CCD pixel offset values falling between the increments can be derived by taking the correction factors for the nearest offset values on either side of the read value and performing an interpolation. Conventional linear interpolation can be employed so long as the increments are sufficiently close to each other. According to one embodiment, eight points are averaged into a single data point having a mean value for offset and adjustment factor. This averaging serves to smooth the adjustment factor curve 738 in addition to reducing the size of the adjustment factor table.

Finally, having derived an adjustment factor curve/table in step 738, the logarithmic output value of every CCD pixel in the array is read during exposure to the same dark intensity, and a table of bias adjustment factors is built. In step 740 an appropriate correction factor (derived from curve 738) is individually mapped to each CCD pixel based upon the amount that the pixel's unadjusted, logarithmic domain output deviates from the established baseline 0 response value. These correction factors are appended to the linear preamplifier output of each CCD pixel, respectively, whenever that pixel transmits an intensity signal.

Note that the values described above have been represented as base-ten counterparts of digital integer values. Appropriate analog/digital and digital/analog converters are used at the bias input and logarithmic output to produce these digital values. Such value are used by the CPU in manipulating data. It is contemplated that the logarithmic and linear values can be expressed in voltage/current terms, and it is recognized that the digital values described herein are representative of underlying voltage/current values. Furthermore, while a logarithmic amplifier is used to process the linear output, any form of signal processing circuit can be employed, and the resulting signal can exhibit any form of linear or non-linear characteristic. Accordingly, the term "signal converter," as used herein shall be taken to denote any type of signal processing circuit that produces a characteristic linear or non-linear output signal from a raw CCD pixel linear output signal. Note also that a second gain calibration can be applied to the pixels, following the above-described bias calibration procedure, according to an embodiment of the invention.

The foregoing has been a detailed description of preferred embodiments of the invention. Various modifications and additions can be made without departing from the spirit and scope of the invention. For example, the illumination assembly of this invention can be applied to a variety of scanner systems either reflecting illumination light from or transmitting light through the image. The camera assembly of this invention can be used in conjunction with a conventional illuminator, such as a fluorescent bulb. While a CCD element is employed according to a preferred embodiment, other types of electro-optical imaging components can be employed in the camera assembly. The CCD utilized can be implemented as a gray scale camera or as a color camera having three or more lines of associated color pixels. The optical, signal processing, illumination and resolution control techniques described herein can be adapted to operate in conjunction with multiple lines of color by those of ordinary skill. Similarly, the reflector arrangement can be adapted to alternative camera arrangements. Additional calibration procedures and filtering techniques can also be employed. Such calibration techniques can be used to adjust the performance and output of the camera element/CCD. Furthermore, while not shown, it is contemplated, according to a preferred embodiment that side guides can be provided to the feed tray the to maintain sheets in a centered relationship within the feeding mechanism. The guides can be adapted to move in conjunction toward and away from each other along the widthwise direction using racks, pinions and the like, based upon well-known arrangements. Alternatively sheets can be registered against one of the widthwise side edges of the tray. Accordingly, this description is meant to be taken by way of example and not to otherwise limit the scope of the invention.

What is claimed is:

1. An illuminator for a digitizing scanner a scanning camera interconnected with a central processing unit, the scanning camera defining discrete pixels arranged in a widthwise direction, the pixels being adapted to acquire an image of a transparent film passing through a widthwise field of view of the scanning camera, the illuminator comprising:

a plurality of light sources, each being a light emitting diode and each being individually arranged in a line across the widthwise field of view so as to face a first side of the transparent film opposite to a second side of the transparent film arranged to face the scanning camera;

a plurality of controllers each interconnected with respective of the plurality of individual light sources, each of the controllers providing a variable driving power to a respective of the plurality of individual light sources; and wherein the central processing unit is constructed and arranged to instruct the controllers to respectively change the driving power to each of the plurality of the light sources in response to a reading of intensity of predetermined of the pixels that are mapped to each of the plurality of light sources so that the scanning camera receives a predetermined illumination pattern across the widthwise field of view and wherein the controllers are adapted to respectively change the driving power during a calibration procedure that occurs with respect to operation of the digitizing scanner after startup of operation of the scanner.

2. The illuminator as set forth in claim 1 further comprising a housing for enclosing the light sources and a diffuser window disposed between the light sources and the scanning camera.

3. The illuminator as set forth in claim 2 further comprising a pair of walls approximately parallel to each other in the widthwise direction.

4. The illuminator as set forth in claim 1 wherein the controllers provide a plurality of current regulating circuits.

5. The illuminator as set forth in claim 4 further comprising an intensity controller interconnected with each of the plurality of controllers for varying a primary driving power to each of the plurality of light sources, the intensity controller being responsive to the central processing unit based upon a predetermined maximum level of light exposure by each of the plurality of light sources at the scanning camera.

6. The illuminator as set forth in claim 5 further comprising a photodetector for detecting an output of a predetermined light source of the plurality of light sources, the photodetector being constructed and arranged to produce a reference signal, the photodetector being interconnected with the intensity controller whereby the predetermined maximum level of light exposure is set and maintained based upon the reference signal.

7. An illuminator for a digitizing scanner having a widthwise field of view, a scanning camera interconnected with a central processing unit comprising:

a plurality of light sources each individually arranged in a line across the widthwise field of view;

a plurality of controllers, each interconnected with respective of the plurality of individual light sources, each of the controllers providing a variable driving power to a respective of the plurality of individual light sources;

wherein the central processing unit is constructed and arranged to instruct the controllers to respectively change the driving power to each of the plurality of the light sources so that the scanning camera receives a predetermined illumination pattern across the widthwise field of view;

wherein the light sources comprise a plurality of light emitting diodes and wherein the controllers provide a plurality of current regulating circuits; an intensity controller interconnected with each of the plurality of controllers for varying a primary driving power to each of the plurality of light sources, the intensity controller being responsive to the central processing unit based upon a predetermined maximum level of light exposure by each of the plurality of light sources at the scanning camera;

a photodetector for detecting an output of a predetermined light source of the plurality of light sources, the photodetector being constructed and arranged to produce a reference signal, the photodetector being interconnected with the intensity controller whereby the predetermined maximum level of light exposure is set and maintained based upon the reference signal; and wherein each of the plurality of controllers comprises a digital/analog converter and a common emitter buffer amplifier interconnected with one of the plurality of light sources, the analog/digital converter being interconnected with and receiving a digital control signal from the central processing unit and interconnected with and receiving the reference signal, the digital/analog converter having an output interconnected with and controlling the common emitter buffer amplifier whereby the driving power of the one of the plurality of light sources is varied.

8. A method for calibrating an illumination assembly in a digitizing scanner having a camera defining a widthwise line of photosensitive pixels, the camera being adapted to scan widthwise lines of an image in a lengthwise direction and a controller for controlling the illumination assembly and the camera, the method comprising the steps of:

(a) during a calibration procedure that occurs with respect to operation of the digitizing scanner after startup of operation of the scanner, incrementally activating predetermined light sources of a plurality of light sources, each of the plurality of light sources comprising a discrete light emitting diode, being arranged in a widthwise line to each project an illumination light therefrom so as to transmit the light to a side of a film being scanned toward the camera which faces an opposing side of the film, the step of incrementally activating including activating light sources that are each spaced apart by a predetermined number of inactivated light sources until all light sources have been activated;

(b) identifying pixels on the camera activated by each of the plurality of light sources and mapping each of the activated pixels to a predetermined of the plurality of light sources;

(c) activating all of the plurality of light sources at a predetermined power level and deriving an intensity signal based upon projected light from the light sources at the camera;

(d) comparing an intensity value for each of the pixels identified in the step of identifying with a predetermined reference intensity value; and (e) changing a power level of each of the plurality of light sources so that a measured exposure value of respective pixels is closer to a desired exposure value based upon readings of intensity at identified pixels mapped to each of the predetermined of the plurality of light sources.

9. The method as set forth in claim 8 further comprising repeating each of steps (c), (d) and (e) a predetermined number of times, whereby the measured intensity values of each of the respective pixels is made closer to a desired exposure characteristic.

10. The method as set forth in claim 9 wherein the step of activating all of the plurality of light sources includes controlling a driving power input to all of the light sources so that each of the light sources has an intensity less than a predetermined maximum intensity.

11. The method as set forth in claim 8 further comprising measuring an output intensity of one of the plurality of light sources to generate the reference intensity value.

12. A method for controlling a width of an illumination line oriented in a widthwise direction and generated by an illumination assembly in a digitizing scanner having a camera assembly for receiving light from a scanned sheet that moves relative to the camera assembly in a lengthwise direction transverse to the widthwise direction, the method comprising the steps of:

providing a plurality of light sources oriented in a line along the widthwise direction each of the light sources being directed to provide illumination light that is centered at a predetermined position along a widthwise line of the sheet;

individually addressing selected of the plurality of light sources to enable the selected of the plurality of light sources to be deactivated; and controlling the step of individually addressing so that the selected of the plurality of light sources are light sources that provide illumination light that is centered with respect to portions of the widthwise line that are remote from a region of the sheet desired to be scanned.

13. The method as set forth in claim 12 wherein the step of controlling includes identifying widthwise edges of the sheet and defining the portions of the widthwise line that are remote based upon widthwise positions of the widthwise edges.

14. The method as set forth in claim 13 wherein the step of identifying includes scanning the sheet to determine widthwise locations of change in scanned density between a free space density and a density greater than free space and the step of defining includes deriving the widthwise positions of the widthwise edges based the widthwise locations of the change in scanned density.

15. The method as set forth in claim 13 wherein the step of controlling includes identifying widthwise limits of a region of interest of an image on the sheet and defining the portions of the widthwise line that are remote based upon widthwise positions of the widthwise limits.

16. An illuminator for a digitizing scanner having a widthwise field of view, a scanning camera interconnected with a central processing unit comprising:

a plurality of light sources, each individually arranged in a line across the widthwise field of view;

a plurality of controllers, each interconnected with respective of the plurality of individual light sources, each of the controllers providing a variable driving power to a respective of the plurality of individual light sources;

wherein the central processing unit is constructed and arranged to instruct the controllers to respectively change the driving power to each of the plurality of the light sources so that the scanning camera receives a predetermined illumination pattern across the widthwise field of view;

a housing for enclosing the light sources and a diffuser window disposed between the light sources and the scanning camera; and wherein the wall comprise tapered walls, the tapered walls tapering between a first spacing apart adjacent the diffuser window and a second wider spacing adjacent the light sources, the walls including a reflective surface thereon.

* * * * *